United States Patent
Brown

(10) Patent No.: US 9,738,402 B2
(45) Date of Patent: Aug. 22, 2017

(54) FLIGHT TEST EQUIPMENT INSTALLATION SYSTEM AND METHOD

(71) Applicant: The Boeing Company, Chicago, IL (US)

(72) Inventor: Luke Brown, Seattle, WA (US)

(73) Assignee: The Boeing Company, Chicago, IL (US)

( * ) Notice: Subject to any disclaimer, the term of this patent is extended or adjusted under 35 U.S.C. 154(b) by 261 days.

(21) Appl. No.: 14/320,297

(22) Filed: Jun. 30, 2014

(65) Prior Publication Data

US 2016/0244186 A1    Aug. 25, 2016

(51) Int. Cl.
| | |
|---|---|
| *B64C 1/20* | (2006.01) |
| *B64F 5/00* | (2017.01) |
| *B64D 9/00* | (2006.01) |
| *B64D 11/06* | (2006.01) |
| *B64F 5/60* | (2017.01) |

(52) U.S. Cl.
CPC .............. *B64F 5/0045* (2013.01); *B64C 1/20* (2013.01); *B64D 9/00* (2013.01); *B64D 9/003* (2013.01); *B64D 11/0696* (2013.01); *B64F 5/60* (2017.01)

(58) Field of Classification Search
CPC .. B64D 9/00; B64D 11/003; B64D 2009/006; B64D 11/0698; B64D 9/003; B64D 11/0696; B64C 1/20; B64C 1/22; B64F 5/0045; B64F 5/60
See application file for complete search history.

(56) References Cited

U.S. PATENT DOCUMENTS

| | | | | | |
|---|---|---|---|---|---|
| 2,918,183 | A | * | 12/1959 | Petersen | B65G 51/03 100/207 |
| 3,381,921 | A | * | 5/1968 | McDonough | B64D 9/003 105/370 |
| 3,496,052 | A | * | 2/1970 | Odenthal | E04C 2/36 156/285 |
| 3,591,121 | A | * | 7/1971 | Parris | B65D 19/0002 108/55.1 |
| 3,683,821 | A | * | 8/1972 | Mangold | B65D 19/0012 108/53.1 |
| 3,810,534 | A | | 5/1974 | Prete, Jr. | |
| 3,902,706 | A | * | 9/1975 | Pincha | B23Q 1/03 125/35 |
| 3,982,639 | A | * | 9/1976 | Haldimann | B62B 3/04 414/276 |
| 4,121,789 | A | * | 10/1978 | Lent | B64D 9/003 410/77 |

(Continued)

OTHER PUBLICATIONS

Jason Paur, "Take a Peek Inside the 747-8 Test Plane", 2010.*

(Continued)

*Primary Examiner* — Assres H Woldemaryam

(57) ABSTRACT

A pallet system for a vehicle may include a cargo pallet having an orthogonal shape. A pallet adapter may be mounted on the cargo pallet. The pallet adapter may be sized and shaped complementary to the cargo pallet and may be attached to an upper side of the cargo pallet. The pallet adapter may include a panel assembly having frame members covered by one or more top skin panels and/or bottom skin panels. The pallet system may include one or more flight test equipment units mounted to the panel assembly.

21 Claims, 16 Drawing Sheets

(56) References Cited

U.S. PATENT DOCUMENTS

| | | | | |
|---|---|---|---|---|
| 4,267,780 | A * | 5/1981 | Candella | B65D 19/0016 108/52.1 |
| 4,349,302 | A * | 9/1982 | Ferguson, Jr. | B64D 9/003 410/46 |
| 4,824,050 | A * | 4/1989 | Courter | B64D 9/00 108/55.1 |
| 5,489,172 | A * | 2/1996 | Michler | B64D 11/0696 244/118.1 |
| 6,302,358 | B1 * | 10/2001 | Emsters | B64C 1/20 244/137.1 |
| 6,789,988 | B1 * | 9/2004 | Moradians | B60P 7/0815 248/503 |
| 6,923,606 | B2 * | 8/2005 | Fehrle | A61G 1/06 211/173 |
| 7,195,201 | B2 * | 3/2007 | Grether | B64C 1/20 244/118.1 |
| 7,506,855 | B2 * | 3/2009 | Frantz | B64C 1/20 244/118.1 |
| 7,507,061 | B2 * | 3/2009 | Wells | B65D 88/022 410/46 |
| 7,665,938 | B2 | 2/2010 | Schulze | |
| 7,681,735 | B2 * | 3/2010 | Youell, Jr. | B65D 19/20 108/51.3 |
| 7,975,979 | B2 | 7/2011 | Bishop | |
| 8,360,363 | B2 * | 1/2013 | Gonnsen | B64C 1/18 244/118.1 |
| 2004/0018067 | A1 * | 1/2004 | Taylor | B64D 9/00 410/46 |
| 2004/0173723 | A1 * | 9/2004 | Looker | B64C 1/20 248/346.02 |
| 2004/0218989 | A1 * | 11/2004 | Huber | B64D 9/00 410/92 |
| 2005/0263030 | A1 * | 12/2005 | Karpati | B64D 9/00 104/88.01 |
| 2008/0135681 | A1 * | 6/2008 | Hearing | B64D 9/00 244/118.1 |
| 2009/0025616 | A1 * | 1/2009 | Merrill | B29C 65/48 108/57.25 |
| 2009/0078818 | A1 * | 3/2009 | Zulkowski | B64B 1/32 244/30 |
| 2009/0116925 | A1 * | 5/2009 | Juchniewicz | B65D 19/0002 410/52 |
| 2009/0283636 | A1 * | 11/2009 | Saint-Jalmes | B64D 11/00 244/118.5 |
| 2010/0096502 | A1 * | 4/2010 | VanderWolk | B64D 11/0696 244/122 R |
| 2011/0176903 | A1 * | 7/2011 | Schulze | B64D 9/003 414/800 |

OTHER PUBLICATIONS

"Seeking the Proper Balance Between Simulation and Flight Test", AIAA, 1999.*
Ancra International, "ANCRA Aircraft Specialty Products," available at <www.avio-diepen.com>, retrieved May 20, 2014.
Airborne Systems, "Air Cargo Pallet Locks," available at <http://www.airborne-sys.com/files/pdf/asg_air_cargo_pallet_locks.pdf>, retrieved May 21, 2014.
Boeing, "Pallets and containers," available at <http://www.boeing.com/assets/pdf/commercial/startup/pdf/CargoPalletsContainers.pdf>, retrieved May 28, 2014.
Paur, J, "Take a Peek Inside the 747-8 Test Plane", Wired, Feb. 2010 [online]. Retrieved from <https://www.wired.com/2010/02/peek-inside-boeing-747-8/>.
Canadian Patent Office, U.S. Pat. No. 2,887,456, Office Action dated Mar. 21, 2017.
European Patent Office, U.S. Appl. No. 15/174,252.5, Office Action dated Jun. 14, 2017.

* cited by examiner

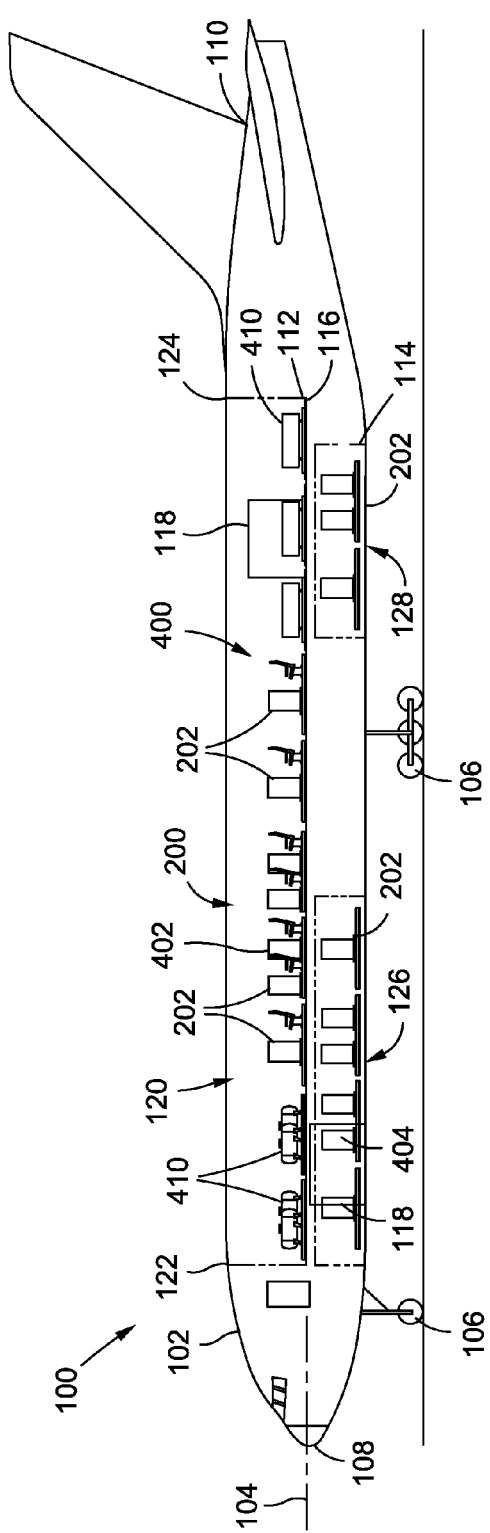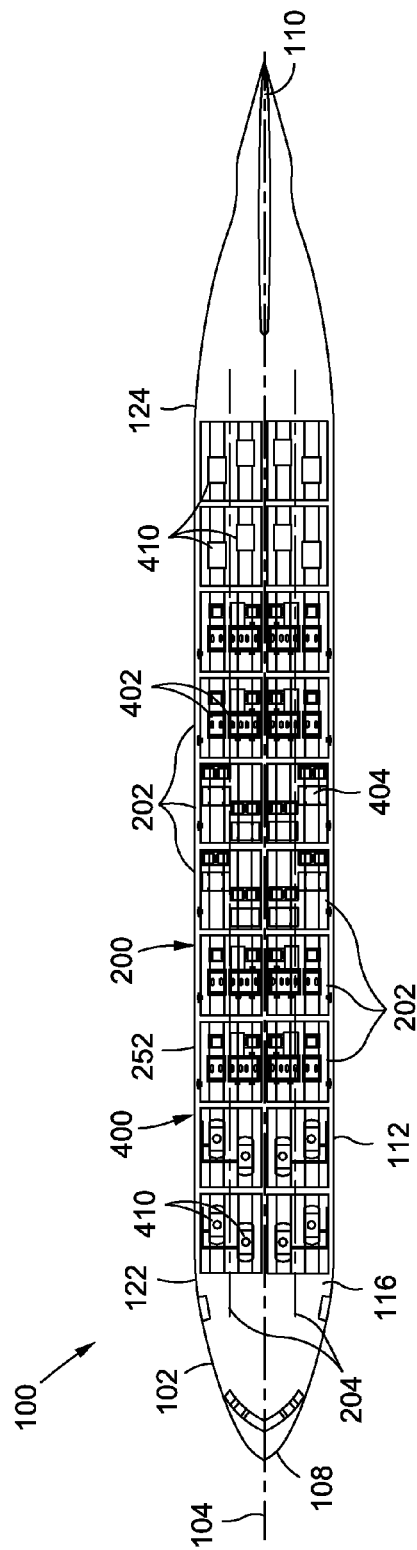

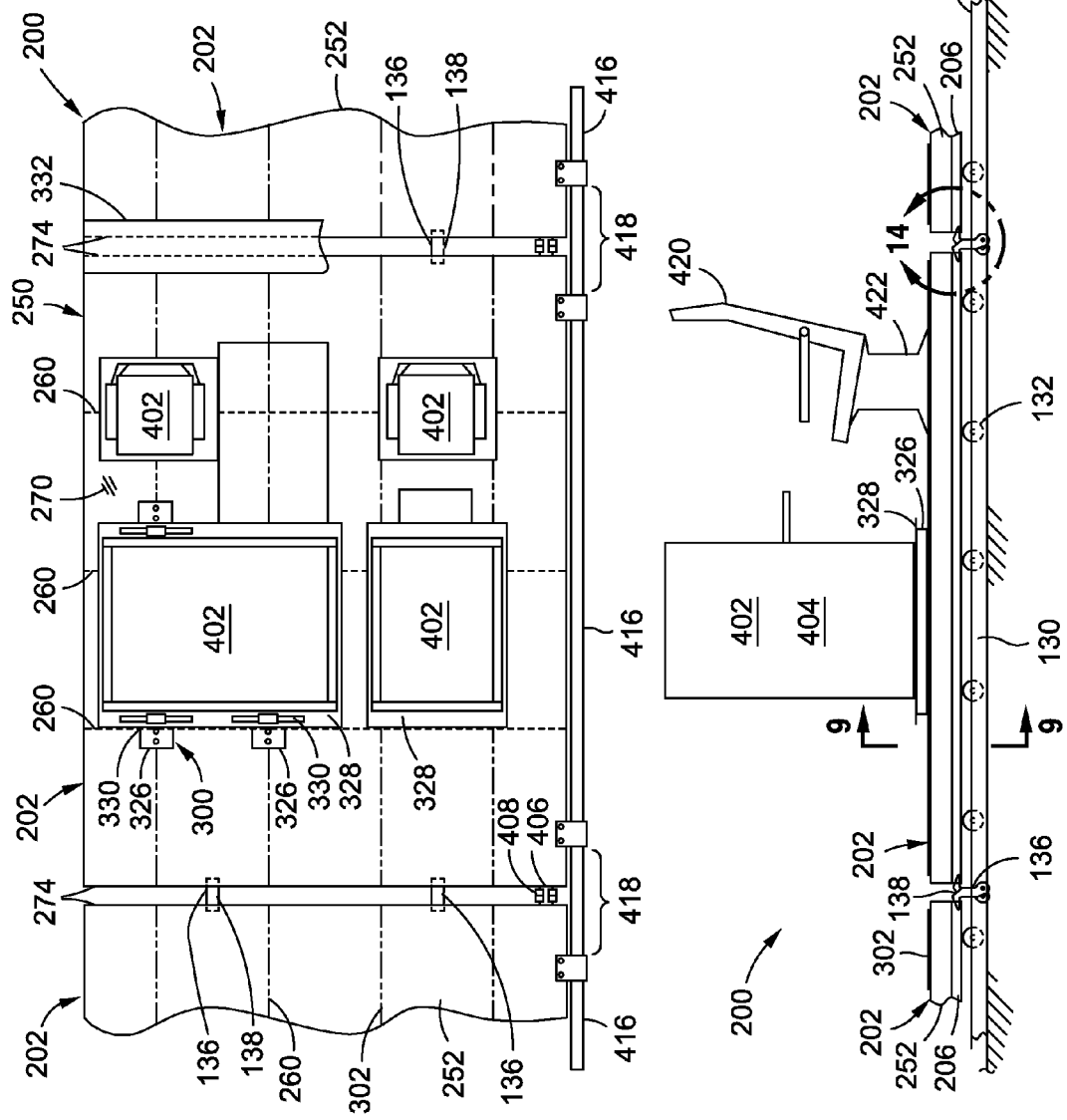

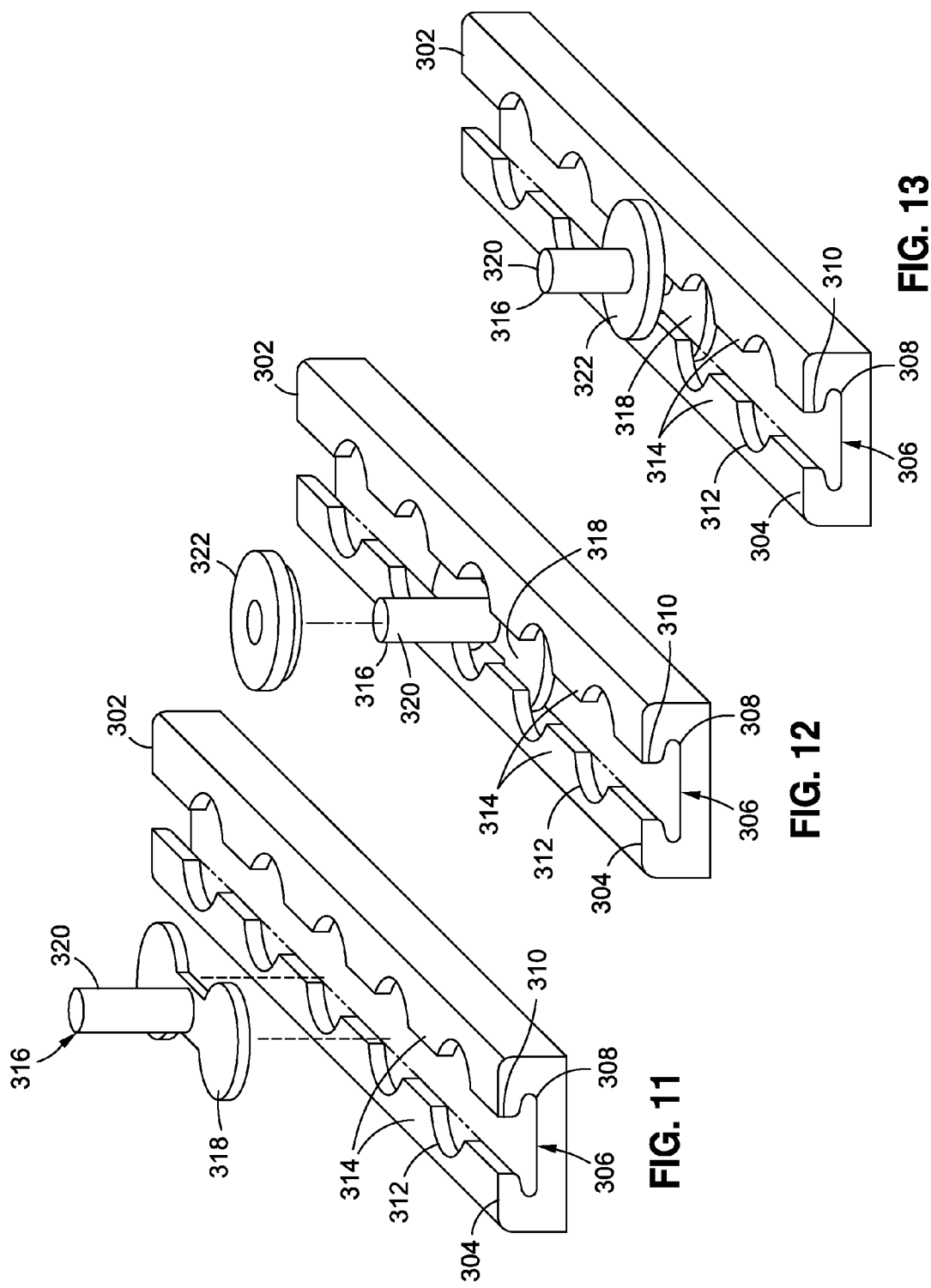

FLIGHT TEST EQUIPMENT INSTALLATION SYSTEM AND METHOD

FIELD

The present disclosure relates generally to vehicle testing and, more particularly, to a system and method for installing flight test equipment in an aircraft.

BACKGROUND

Flight testing of an aircraft involves the use of a relatively large quantity of flight test equipment units for testing the operation of various systems and components of the aircraft during flight. For example, flight testing of a transport aircraft may require the installation of a plurality of ballast tanks at different locations along a length of the aircraft fuselage. The ballast tanks may contain liquid such as water which may be pumped through conduits connecting the ballast tanks to shift the center of gravity (CG) of the aircraft forward or aftward during flight to assess the effect of CG shift on aircraft performance. The flight test equipment may also include a large quantity of electronic components such as data acquisition devices, data processors, and other electronic equipment for monitoring and analyzing the performance of the various aircraft systems. For example, the flight test equipment may include data acquisition devices and processors to collect and analyze data from sensors configured to measure the operating characteristics of the aircraft propulsion units, flight controls, and a variety of other aircraft systems.

Conventional methods for configuring an aircraft for flight testing may include mounting the large quantity of individual flight test equipment components in the aircraft interior. Each component may be permanently attached to individual mounting points which may be unique to the aircraft and therefore must be custom-designed and manufactured for each component. Prior to installation on the aircraft, the individual flight test equipment components must be electrically interconnected to one another and pre-tested to confirm that the assembled components function as intended. Following pre-testing, the components must be disconnected from one another, and manually installed in the aircraft where each component may be individually attached to the customized mount points in the aircraft interior and electrically interconnected. Following flight testing, the individual flight test components must be detached from their individual mounting points, electrically disconnected from one another, and then manually removed from the aircraft. Unfortunately, the above-described conventional method of installing and removing flight test equipment from an aircraft is a complex and time-consuming operation.

As can be seen, there exists a need in the art for a system and method for installing and removing flight test equipment from an aircraft in a manner that avoids the time and complexity associated with the mounting and electrical interconnecting individual flight test equipment components.

SUMMARY

The above-noted needs associated with configuring an aircraft for flight testing are specifically addressed by the present disclosure which provides a pallet system for a vehicle. The pallet system may include a cargo pallet and a pallet adapter. The pallet adapter may be mounted on the cargo pallet. The pallet adapter may be sized and shaped complementary to the cargo pallet and may be attached to an upper side of the cargo pallet. The pallet adapter may include a panel assembly having frame members covered by one or more top skin panels and/or bottom skin panels. The pallet system may include one or more flight test equipment units mounted to the panel assembly.

Also disclosed is an aircraft having a cargo compartment floor. The cargo compartment floor may include one or more pallet locks. The aircraft may include a plurality of pallet assemblies secured to the cargo compartment floor. Each pallet assembly may include a standardized cargo pallet having a flat, orthogonal shape. The cargo pallet may be sized complementary to a standard aircraft cargo compartment floor arrangement of pallet lock locations. The aircraft may further include a pallet adapter sized and shaped complementary to the cargo pallet and mechanically fastened to an upper side of the cargo pallet. The pallet adapter may include a panel assembly formed of frame members covered by one top and bottom skin panels and having a hollow interior. One or more may include units may be mounted to the panel assembly.

Also disclosed is a method of installing flight test equipment in a vehicle. The method may include mounting one or more flight test equipment units on a plurality of pallet assemblies. Each pallet assembly may include a standardized cargo pallet and a pallet adapter sized complementary to the cargo pallet and attached to an upper side of the cargo pallet. The pallet adapter may include a panel assembly supporting one or more flight test equipment units. The method may include interconnecting the flight test equipment of the pallet assemblies to form a flight test equipment setup, and testing the flight test equipment setup in an off-vehicle location. The method may further include installing the pallet assemblies on a cargo compartment floor of a vehicle, and using the flight test equipment setup to perform a flight test program.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a side view of an aircraft including a plurality of pallet assemblies each supporting flight test equipment secured to a cargo compartment floor on a main deck and a cargo deck of the aircraft;

FIG. 2 is a top view of the aircraft of FIG. 1 illustrating the plurality of pallet assemblies each supporting flight test equipment;

FIG. 7 is a top view of a pallet assembly having flight test equipment mounted to the pallet assembly and further illustrating flexible fluid connectors interconnecting the fluid conduits extending along the sides of the pallet assemblies;

FIG. 8 is a side view of the pallet assembly of FIG. 7;

FIG. 11 is a perspective view of a portion of an example of the seat track as may be mounted to a top side of the panel assembly;

FIG. 12 is a perspective view of a seat track fitting of FIG. 11 and showing the seat track fitting installed in a hollow groove in the seat track;

FIG. 13 is a perspective view of the seat track fitting of FIG. 11 and showing a locking member for locking the longitudinal position of the seat track fitting at the location of a cutout formed in the seat track;

DETAILED DESCRIPTION

Figure 3:
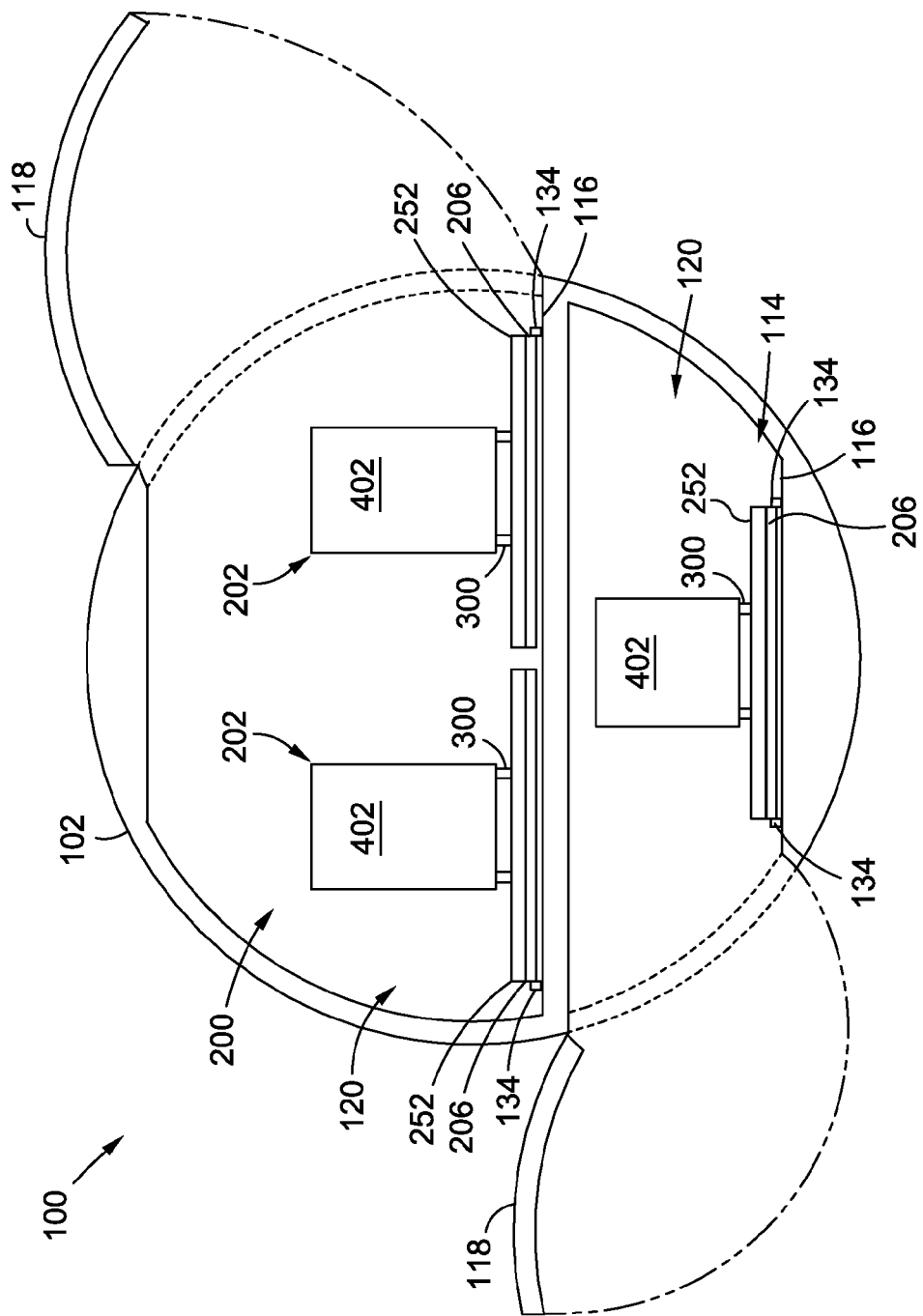
FIG. 3 is a sectional view of a fuselage showing pallet assemblies secured to a cargo compartment floor on a main deck and a cargo deck of an aircraft.

Referring now to the drawings wherein the showings are for purposes of illustrating various embodiments of the disclosure, shown in FIG. 1 is a side view of an aircraft 100. The aircraft may include a fuselage 102 supported on landing gear 106. The fuselage 102 may have a nose 108 at a forward end and an empennage 110 at an aft end 124. A longitudinal axis 104 may extend between the nose 108 and the empennage 110. The aircraft 100 may be loaded with a plurality of pallet assemblies 202 which may be secured to a cargo compartment floor 116 on a main deck 112 and/or a cargo deck 114 of the aircraft 100. The cargo deck 114 may be divided into a forward cargo compartment 126 and an aft cargo compartment 128. The pallet assemblies 202 may each include one or more flight test equipment 402 units that collectively make up a flight test equipment setup 400.

Each one of the flight test equipment 402 units may be fixedly mounted to the pallet assemblies 202. The pallet assemblies 202 may be loaded into an aircraft 100 such as through one or more cargo doors 118 formed in the fuselage 102. Although the pallet assemblies 202 disclosed herein are described in the context of an aircraft 100, the pallet assemblies 202 may be configured for mounting in any type of vehicle, without limitation, including marine vessels such as ships, amphibious craft, submarines, ferries, and cargo ships, air vehicles such as commercial, civilian, and military fixed-wing aircraft and rotor-wing aircraft, and land vehicles such as motor vehicles including tractor-trailers, railway freight cars, and other vehicles.

In FIG. 1, the cargo compartment floor 116 on the main deck 112 and/or on the cargo deck 114 may include side bumpers or side rails 134 (FIG. 4), roller tracks 130 (FIG. 4), pallet locks 136 (FIG. 4), and other features for moving the pallet assemblies 202 over the cargo compartment floor 116 and securing into a predetermined position on the cargo compartment floor 116 relative to other pallet assemblies 202 that make up the flight test equipment setup 400. The cargo compartment floor 116 may include pallet locks 136 located at spaced intervals along the cargo compartment floor 116 to secure or lock each pallet assembly 202 in position and prevent movement in the forward-aft direction, in the lateral direction, and/or in the vertical direction. When deployed, the pallet locks 136 may prevent horizontal movement (e.g., forward-aft and lateral) and vertical movement of the pallet assemblies 202. In some examples, the cargo compartment floor 116 may include pallet locks 136 configured to prevent lateral or side-to-side movement of the pallet assemblies 202 and such pallet locks 136 may be configured similar to the pallet locks 136 shown in the figures and described in greater detail below. Although FIG. 1 shows the main deck 112 and the cargo deck 114 loaded with pallet assemblies 202, an aircraft 100 may be loaded with pallet assemblies 202 that only partially fill the main deck 112 and/or only partially fill the cargo deck 114 of the aircraft 100. In other examples, either the main deck 112 or the cargo deck 114 may be partially or completely filled with pallet assemblies 202, and the remaining deck may be devoid of pallet assemblies 202.

FIG. 2 is a top view of an aircraft 100 showing an example of an arrangement of pallet assemblies 202 each supporting one or more flight test equipment 402 units. One or more of the pallet assemblies 202 may be configured for supporting ballast tanks 410. For example, the forward and aft end 122, 124 of the cargo compartment 120 in FIG. 2 may include pallet assemblies 202 supporting ballast tanks 410. As indicated above, the ballast tanks 410 may contain water or other liquid which may be pumped through fluid conduits 416 to ballast tanks located at other positions within the aircraft 100. The liquid may be pumped to different ballast tanks to shift the center of gravity (CG) of the aircraft 100 during flight to assess the effect on aircraft 100 performance which may be monitored and analyzed using flight test equipment 402 that may be supported on other pallet assemblies 202.

In some examples, each one of the pallet assemblies 202 may include a panel assembly 252 mounted on top of a standardized cargo pallet 206. The standardized cargo pallet 206 may be provided in standardized pallet sizes of common length 254 and width 256. The length 254 and width 256 of each cargo pallet 206 may correspond to standardized positions on an aircraft 100 cargo compartment floor 116 where freight containers (e.g., unit load devices or ULDs) or pallets may fit. In this regard, the standardized positions on the cargo compartment floor 116 may be based upon the width of the aircraft 100 and the spacing of pallet locks 136 mounted at spaced intervals along the length of the cargo compartment floor 116. In the example shown, a plurality of pallet assemblies 202 may be arranged side-by-side in two columns at predetermined forward-aft positions on the cargo compartment floor 116. The rows of pallets may be aligned with the longitudinal axis 104 of the aircraft 100. However, the pallet assemblies 202 may be arranged in a single column on the cargo compartment floor 116.

FIG. 3 is a sectional view of an aircraft fuselage 102 having a main deck 112 and a cargo deck 114 located below the main deck 112. A lower cargo compartment 120 such as on the cargo deck 114 of the aircraft 100 may have a semi-circular cross-sectional shape with a flat floor. An upper cargo compartment 120 such as on the main deck 112 of the aircraft 100 may also have a semi-circular shape with a beveled ceiling. Pallet assemblies 202 may be loaded into the aircraft 100 through one or more cargo doors 118. The cargo door 118 may be formed in the side of the fuselage 102 at a forward end 122 or an aft end 124 of a cargo compartment 120 or any location in between the forward and aft end 122, 124 on the main deck 112 and/or cargo deck 114. The cargo deck 114 and the main deck 112 may each include a cargo compartment floor 116 having the above-mentioned rollers 132 (FIG. 4), pallets locks 136 (FIG. 4), and other provisions for moving pallet assemblies 202 along the cargo compartment floor 116 and for locking the pallet assemblies 202 against movement once the pallet assemblies 202 are positioned on the cargo compartment floor 116.

The cargo compartment floor 116 may include provisions for restraining cargo pallets 206 of common sizes. In some examples, the cargo compartment floor 116 may include provisions (e.g., pallet locks 136) for restraining cargo pallets 206 designated as LD9 cargo pallets having a footprint or base dimensions of approximately 96 inches in width and either 10 feet, 16 feet, or 20 feet in length. The cargo compartment floor 116 may also be adapted for restraining cargo pallets 206 designated as LD3 cargo pallets having a footprint or base dimensions of 60.4 inches in width and 61.5 inches in length. However, the cargo compartment floor 116 may include provisions for accommodating any one of a variety of different sizes of cargo pallets 206 including standard size cargo pallets (e.g., LD1, LD2, LD3, LD4, LD5, LD6, LD7, LD8, LD9, LD11, LD26, LD29, LD39, etc.) and/or the cargo compartment floor 116 may include provisions for accommodating non-standard size cargo pallets (not shown) of any size, shape, and configuration, without limitation.

In examples where the cargo pallet footprint (e.g., pallet length 254 and width 256) does not match the locations of the pallet locks 136 on the cargo compartment floor 116, or in cases where the cargo pallet 206 must be centered along the longitudinal axis 104 or centerline of the aircraft 100, tie-down straps (not shown) may be used to retrain the pallet assembly 202 against movement. The cargo straps (not shown) may extend from the pallet assembly 202 and/or from the flight test equipment 402 to one or more hard points (not shown) or tie down rings (not shown) provided along the fuselage 102 interior walls or along the cargo compartment floor 116. As indicated above, the pallet assemblies 202 may be sized based upon commonly-available sizes (e.g., length 254 and width 256) of cargo pallets 206.

Figure 4:
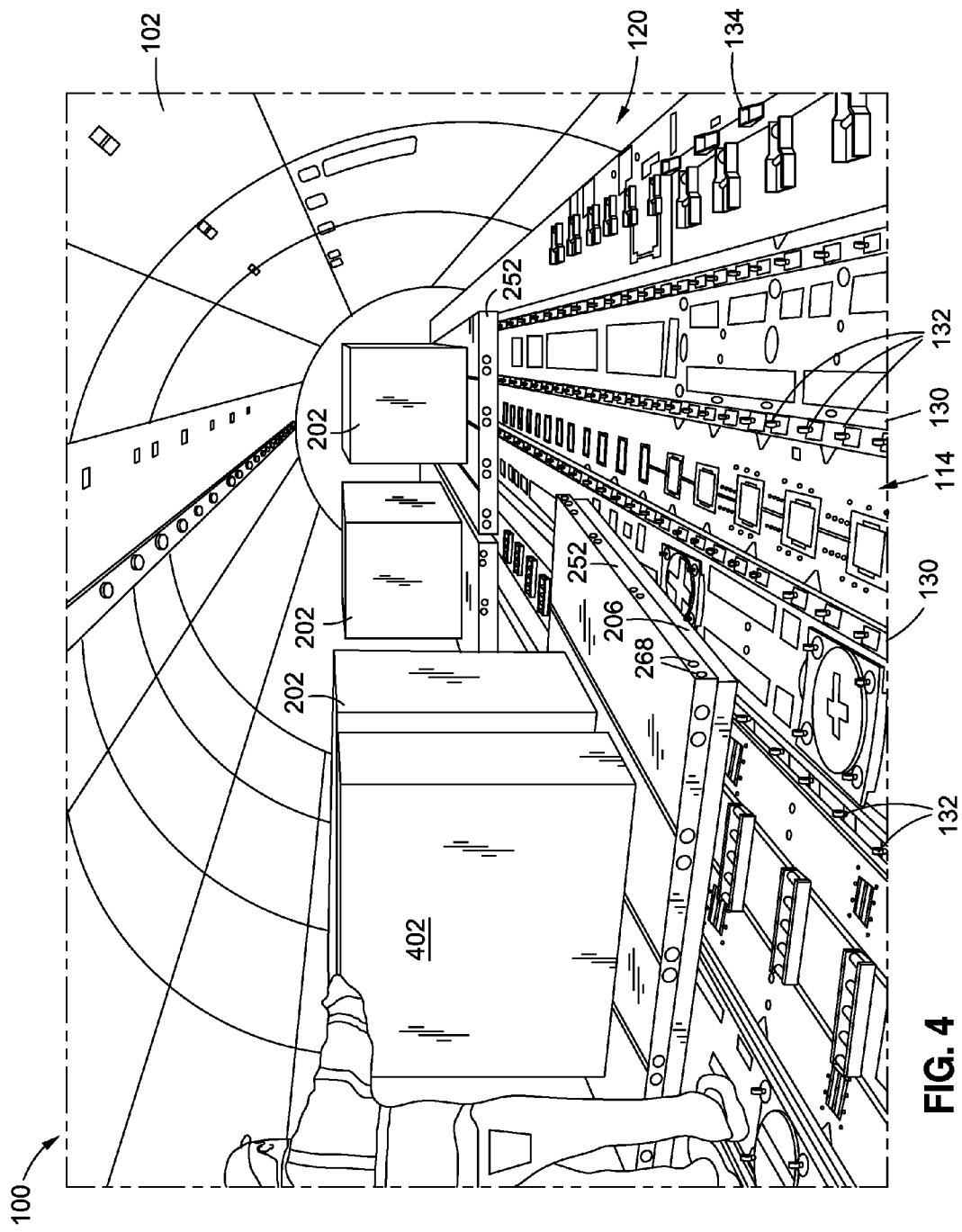
FIG. 4 is a perspective view of an interior of a cargo compartment showing the positioning of a pallet assembly on the cargo compartment floor.

FIG. 4 illustrates an example of an interior of a cargo compartment 120 and shows a pallet assembly 202 being moved into position on the cargo compartment floor 116. As mentioned above, a cargo compartment floor 116 may include one or more roller tracks 130 over which the pallet assemblies 202 may be rolled. The roller tracks 130 may be oriented parallel to one another and may extend partially or entirely along a length of a cargo compartment 120. The roller tracks 130 may be configured as U-shaped channels mounted to the cargo compartment floor 116 and may include linear rollers 132 located at spaced intervals along the roller track. A portion of each roller 132 may protrude above the top edge of the roller tracks 130.

A cargo compartment floor 116 may also include one or more caster wheels or unidirectional rollers 132 to facilitate rotation of the pallet assemblies 202 about a vertical axis. For example, near the opening of a cargo door 118, the cargo compartment floor 116 may include sets of castor wheels or unidirectional rollers (not shown). The caster wheels or unidirectional rollers may facilitate the pivoting of the pallet assemblies 202 as the pallet assemblies are guided through the cargo door 118 and into the cargo compartment 120. The unidirectional rollers may also allow the pallet assemblies 202 to be moved against the side bumpers or side rails 134 on one side of the cargo compartment 120, or to facilitate the alignment of the longitudinal axis 204 of the pallet assemblies 202 with the longitudinal axis 104 of the aircraft 100. The pallet assemblies 202 may be guided through the cargo door 118 into the cargo compartment 120 by cargo loading technicians. The cargo compartment floor 116 may optionally include one or more motorized devices such as power drive units (e.g., PDUs) located at the cargo door 118 entrance to assist the cargo loading technicians in moving the pallet assemblies 202 into and out of the aircraft 100.

In some examples, each pallet assembly 202 may be oriented such that the longitudinal axis 204 of the pallet assembly 202 is parallel to the longitudinal axis 104 of the aircraft 100. The longitudinal axis 204 of the pallet assembly 202 may be described as the axis extending along the longest dimension (i.e., the length 254) of the footprint of the cargo pallet 206. However, in other examples, the longitudinal axis 204 of a pallet assembly 202 may be oriented at an angle relative to the longitudinal axis 104 of the aircraft 100. For example, a pallet assembly 202 positioned at an extreme forward end 122 or aft end 124 of a cargo compartment 120 may be oriented at an angle relative to the aircraft longitudinal axis 104 in order to allow the pallet assembly 202 fit within a tapering width of the fuselage 102 at the forward and aft end 124 of the aircraft cargo compartment.

Figure 5:
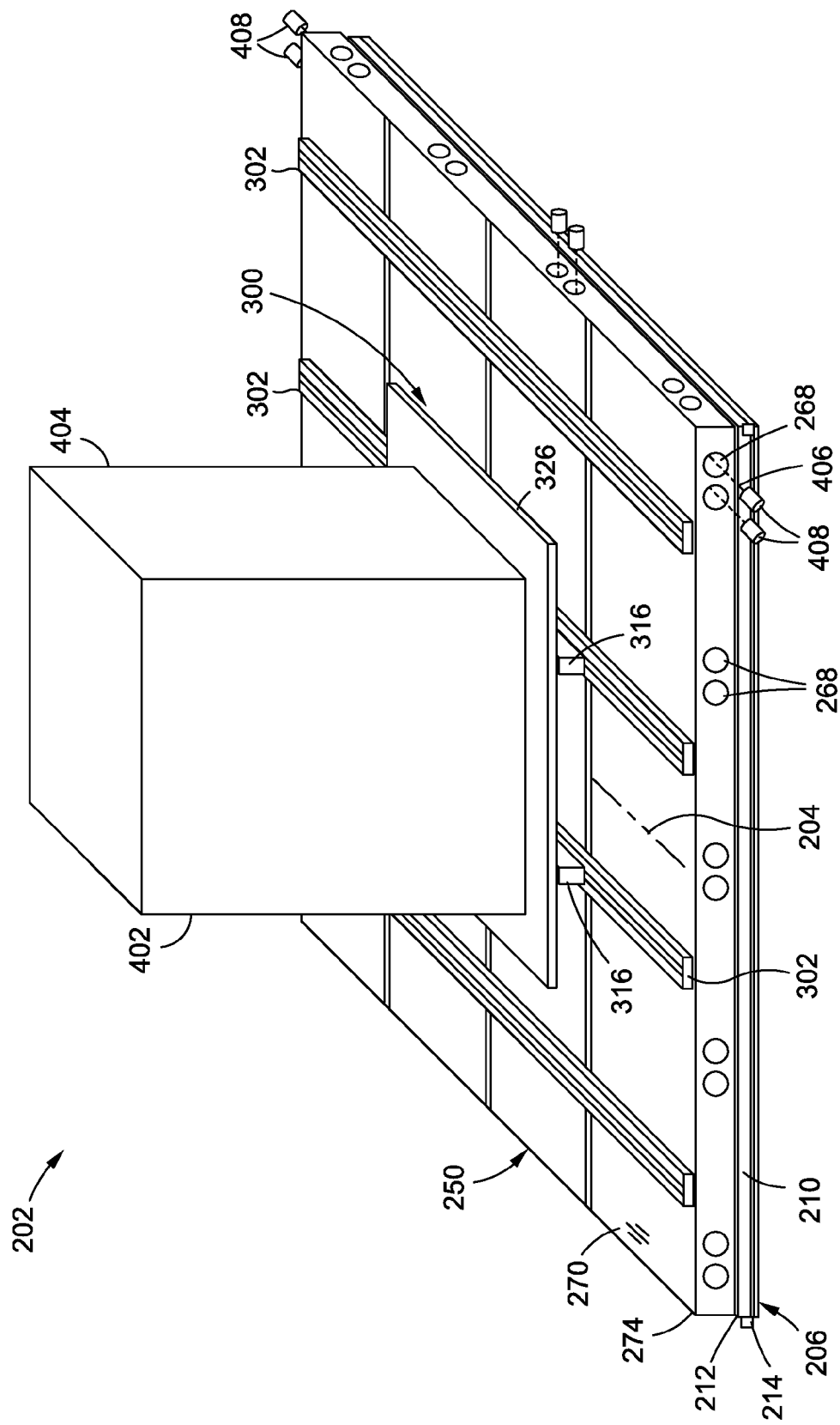
FIG. 5 is a perspective view of an example of a pallet assembly including a standardized cargo pallet having a pallet adapter attached to an upper side of the cargo pallet and supporting flight test equipment.

FIG. 5 shows an example of a pallet assembly 202 which may be made up of a pallet adapter 250 and a standardized cargo pallet 206. The pallet adapter 250 may be mechanically fastened, welded, bonded, and/or otherwise attached to an upper side of the cargo pallet 206. The standardized cargo pallet 206 may be generally flat and may have an orthogonal shape such as a rectangular or a square shape. As indicated above, the length 254 and width 256 of the standardized cargo pallet 206 may be sized complementary to standardized locations of pallet mounting provisions of a cargo compartment floor 116 such as pallet locks 136 that may be spaced at standardized intervals along the length and or width of the cargo compartment floor 116. A cargo pallet 206 may have a metallic (e.g., aluminum) or non-metallic (i.e., carbon fiber composite) durable top skin and bottom skin which may be oriented substantially parallel to one another. The top skin and a bottom skin may encapsulate a lightweight core formed of foam, balsa wood, or other core material. In another example, the cargo pallet 206 may include a lattice frame-type construction (not shown) of internal beams and/or stringers to which a top skin and/or a bottom skin may be secured by fastening and/or bonding. In the present disclosure, the cargo pallet 206 may include pallet support beams 210 extending along one or more perimeter edges 208 of the cargo pallet 206. The perimeter edges 208 of the cargo pallet 206 may be configured to be engaged by one or more of the pallet locks 136 of the cargo compartment floor 116.

Figure 6:
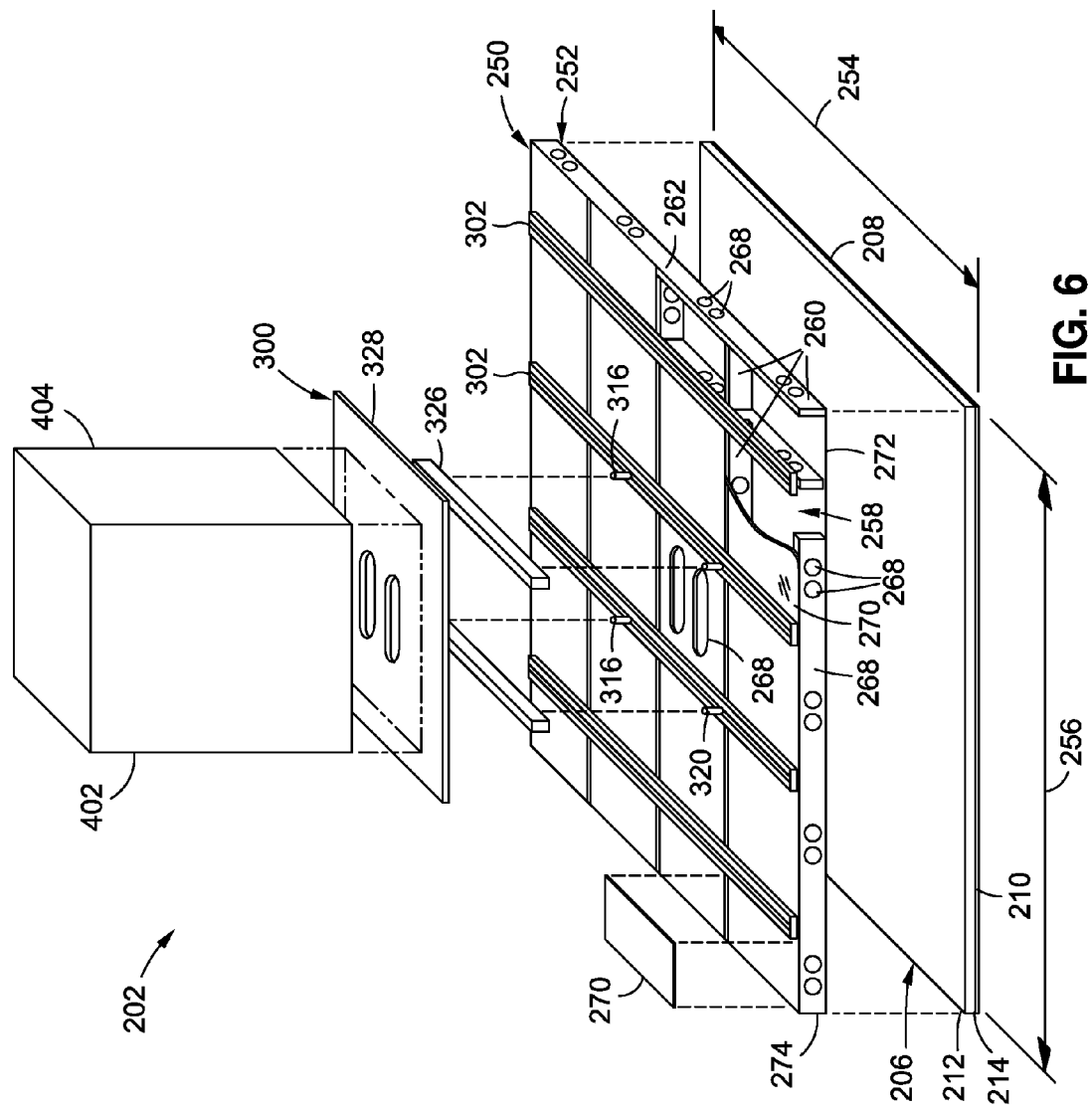
FIG. 6 is an exploded perspective view of the pallet assembly of FIG. 5.

FIG. 6 is an exploded perspective view of the pallet assembly 202 of FIG. 5. The panel assembly 252 may have a high-strength, high-stiffness construction and may be mounted to the top of the cargo pallet 206 as indicated above. Each panel assembly 252 may include one or more frame members 260 or beams which may be covered by one or more top skin panels 270 and one or more bottom skin panels 272. The frame members 260 of the panel assembly 252 may include one or more longitudinal frame members 262 which may be oriented generally parallel to one another and may extend along a lengthwise direction of the panel assembly 252. The frame members 260 may also include one or more transverse frame members 264 which may extend in a widthwise direction of the panel assembly 252. However, the panel assembly 252 may include frame members 260 oriented in any direction and in any arrangement and are not limited to that which is shown in FIG. 6.

Figure 15:
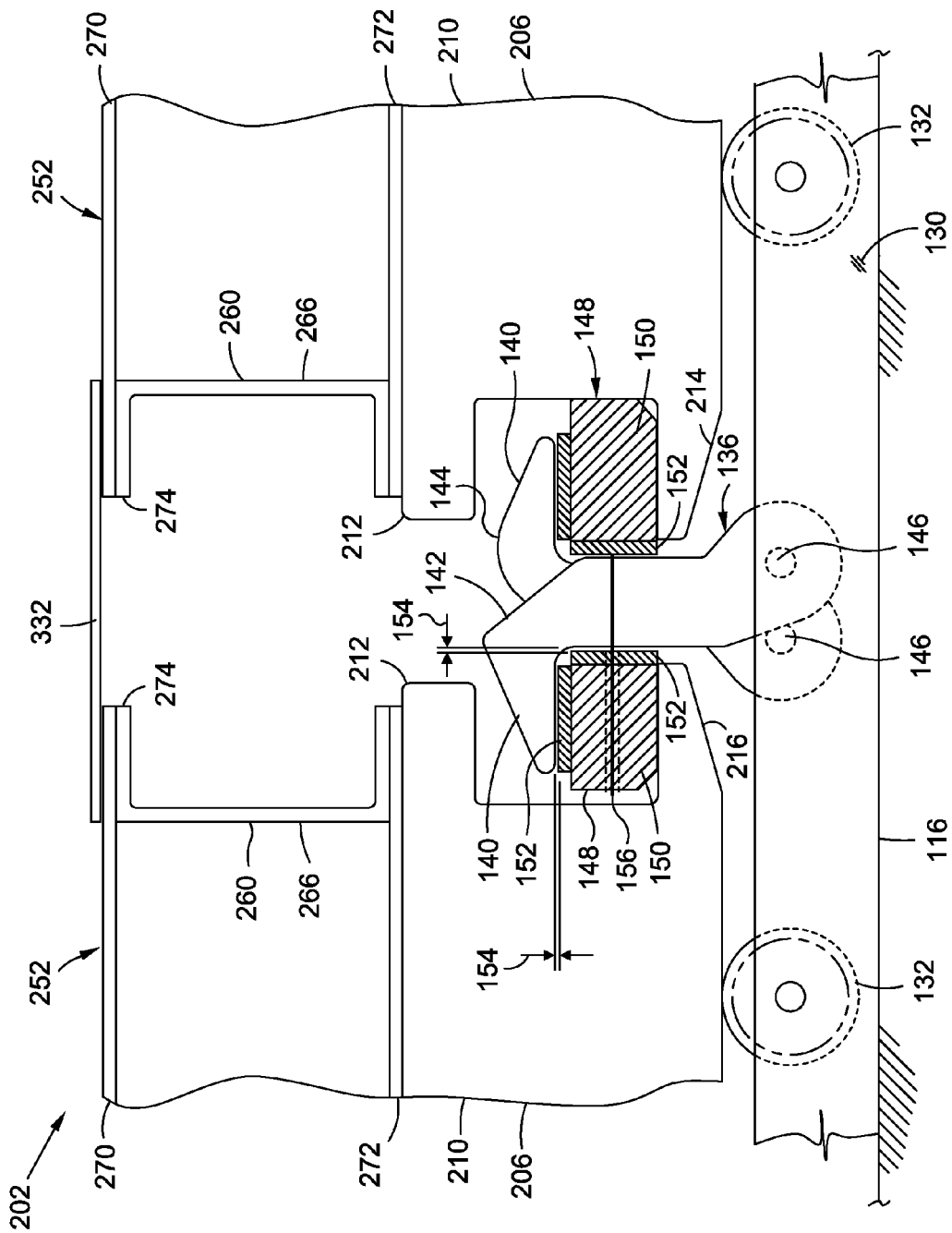
FIG. 15 is a side view of a pair of pallet locks engaged to cargo pallets of adjacent pallet assemblies and showing a shim assembly installed between each pallet lock and cargo pallet.

In the example shown, the transverse frame members 264 may be configured as frame segments extending between the adjacent pairs of longitudinal frames. In one example, the frame members 260 may include a vertical web 266 (FIG. 15) and top and bottom flanges (FIG. 15). For example, one or more of the frame members 260 may be provided in a C-channel cross-section (FIG. 15) or in other cross-sectional shapes such as in an I-beam cross-section. The frame members 260 may be interconnected to one another. One or more of the top skin panels 270 and bottom skin panels 272 may be removably mounted to the frame members 260 such as by using mechanical fasteners (e.g., screws or bolts) threadably engaged to inserts, nut plates, or other threaded receptacles mounted to the frame members 260. For example, at least one of the top skin panels 270 may be removable from the panel assembly 252 to allow access to the panel assembly interior 258 to facilitate installation, inspection, maintenance, and/or repair of electrical wiring 406 or other conduits passing through the panel assembly interior 258. One of more of the frame members 260 may include one or more wiring holes 268 to allow the passage of electrical wiring 406, conduits, or other system through the panel assembly interior 258. One or more of the top skin panels 270 may also include one or more wiring holes 268 for routing electrical wiring 406 from the flight test equipment 402 into the panel assembly interior 258.

The pallet assembly 202 may include a flight test equipment mounting system 300 for adjustably mounting the flight test equipment 402 on the panel assembly 252. In one example, the flight test equipment mounting system 300 may include one or more seat tracks 302 affixed to a top side of the panel assembly 252. The seat tracks 302 may provide a means for adjusting the position of the flight test equipment 402 on the panel assembly 252. The flight test equipment support panel 328 may be configured to support one or more flight test equipment 402 units. The flight test equipment 402 units may be provided in any one of a variety of different configurations. For example, one or more of the flight test equipment 402 units may be configured as electronics 404 such as file servers, data processors, workstations with displays or monitoring screens, and other flight test equipment 402 for testing different aircraft 100 systems and for monitoring and analyzing the operating performance of the aircraft 100 and systems. For example, one or more flight test equipment 402 units may be configured for testing the navigation systems, flight controls, communication systems, data and other aircraft 100 systems.

FIG. 7 shows a top view of a pallet assembly 202 with flight test equipment 402 mounted to the panel assembly 252. The flight test equipment 402 units may be mounted on one or more flight test equipment support panels 328 which, in turn, may be secured to one or more flight test equipment support beams 326 using one or more panel clamps 330. The flight test equipment support panels 328 may be secured to the panel assembly 252 by means of the seat tracks 302 which may extend lengthwise along the panel assembly 252. One or more of the panel assemblies 252 may include seats 420 mounted to one or more of the seat tracks 302. The seats may support flight test engineering personnel who may be monitoring, controlling, or overseeing one or more aspects of a flight test program. The panel assemblies 252 may be connected to adjacent panel assemblies 252 for transmission of power, data, and communication between the panel assemblies 252. As indicated above, electrical wiring 406 extending through the panel assembly interior 258 may terminate at electrical connectors 408 which may extend out of wiring holes 268 on one or more sides of each panel assembly 252. The electrical connectors 408 provide a convenient means for interconnecting the flight test equipment 402 of the pallet assemblies 202 during the installation and removal of the flight test equipment 402 from the aircraft 100.

In the example shown, each one of the pallet assemblies 202 may include provisions for supporting one or more fluid conduits 416 which may extend along the lengthwise sides of each pallet assembly 202 to fluidly interconnect the ballast tanks 410 positioned at different locations along the length of the cargo compartment floor 116. The flexible conduit connectors 418 may be used to fluidly interconnect the fluid conduits 416 of an adjacent pair of pallet assemblies 202. The flexible conduit connectors 418 may be formed of flexible material such as elastomer material such as fiber-reinforced rubber or other material. The flexible fluid connectors may be clamped over the terminal ends of the fluid conduits 416, and may accommodate relative shifting of the pallet assemblies 202 in the forward-aft direction during flight. The flexible fluid connectors may prevent overstressing the fluid conduits 416 mounted to the sides of the pallet assemblies 202 or overstressing fittings (not shown) coupling the fluid conduits 416 to the ballast tanks 410.

In FIG. 7, after securing the panel assemblies 252 to the cargo compartment floor 116 using pallet locks 136, one or more gap covers 332 may be applied over the gaps or spaces between the perimeter edges 274 of the opposing sides or the opposing ends of adjacent pairs of panel assemblies 252. The gap covers 332 may be configured as relatively stiff and lightweight sheets or plates formed of metallic and/or non-metallic material. The gap covers 332 may be removably secured in position using hook-and-loop fastener material (e.g., Velcro™ tape), mechanical fasteners, quick-release pins, and/or the gap covers 332 may simply be held in place using gravity. In one example, Velcro™ tape may be applied to the bottom surfaces of the gap cover 332 and to the top surfaces of the adjacent pallet assemblies 202 along the perimeter edges 274. The gap covers 332 may provide a smooth surface for personnel to walk on, and may prevent personnel stepping into the gaps or spaces between adjacent pairs of pallet assemblies 202.

FIG. 8 is a side view of a pallet assembly 202 showing the cargo pallet 206 supported on the rollers 132 of the cargo compartment floor 116. Each panel assembly 252 may be mounted on top of a cargo pallet 206. The perimeter edge 208 of each cargo pallet 206 may be engaged by one or more pallet locks 136 extending upwardly from the cargo compartment floor 116. In the example shown, the pallet locks 136 are in a deployed position 138 to prevent movement of the pallet assemblies 202 in a forward-aft direction (e.g., parallel to the longitudinal axis 104 of the aircraft 100) and in a vertical direction. The cargo compartment floor 116 may optionally also include pallet locks (not shown) or side bumpers (not shown) to prevent movement of the pallet assemblies 202 in a lateral direction (e.g., perpendicular to the longitudinal axis 104 of the aircraft 100). Also shown in FIG. 8 is the mounting of the flight test equipment 402 units and the seats 420 to the panel assembly 252 using one or more flight test equipment mounting systems 300. The seats 420 may include a seat base 422 which may be secured to the seat tracks 302 to accommodate an occupant such as a flight test engineer who may monitor and/or operate one or more aspects of the flight test equipment 402 during a flight test program.

Figure 9:
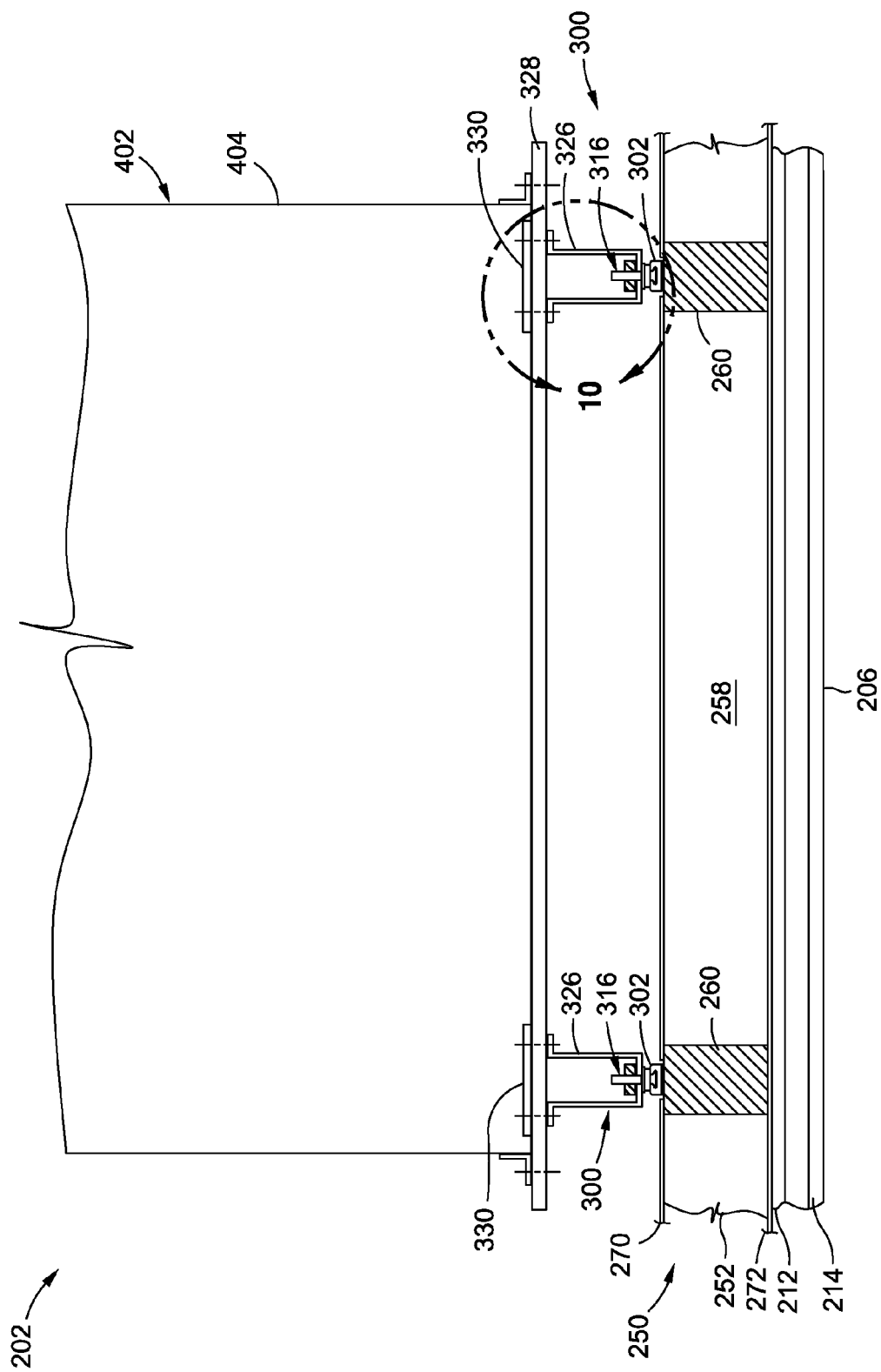
FIG. 9 is a sectional view of a panel assembly taken along line 9 of FIG. 8 and showing flight test equipment unit mounted to the panel assembly using a flight test equipment mounting system.

FIG. 9 is a sectional view of the pallet assembly 202 showing an example of the flight test equipment 402 mounted to the panel assembly 252 using a flight test equipment mounting system 300. The pallet assembly 202 may include the panel assembly 252 which may be coupled to the top side of the cargo pallet 206 as indicated above. The pallet assembly 202 may be made up of internal frame members 260 covered by top and bottom skin panels 270, 272. The flight test equipment mounting system 300 may include a plurality of seat tracks 302 mounted to the top of the panel assembly 252. One or more of the seat tracks 302 may be fixedly attached to a top side of one or more frame members 260. The seat tracks 302 may extend lengthwise along the top side of the panel assembly 252. However, the seat tracks 302 may extend in any direction including a lateral direction of the panel assembly 252.

The flight test equipment mounting system 300 may include one or more flight test equipment support beams 326 on which a flight test equipment support panel 328 may be mounted. One or more of the flight test equipment 402 units may be supported by a flight test equipment support panel 328. The flight test equipment support panel 328 may include one or more angle members butted up against the lateral sides of the flight test equipment 402 unit. The flight test equipment support panels 328 may be clamped in position by mechanical fasteners extending through panel clamps 330 located on a top side of the flight test equipment support panel 328. In other examples, the flight test equipment support panel 328 may be directly mounted to the flight test equipment support beams 326. The flight test equipment support beams 326 may provide vertical spacing between the flight test equipment support panel 328 and the panel assembly 252. The vertical spacing may facilitate the removal and installation of the removable top skin panels 270 to access to the hollow panel assembly interior 258

Figure 10:
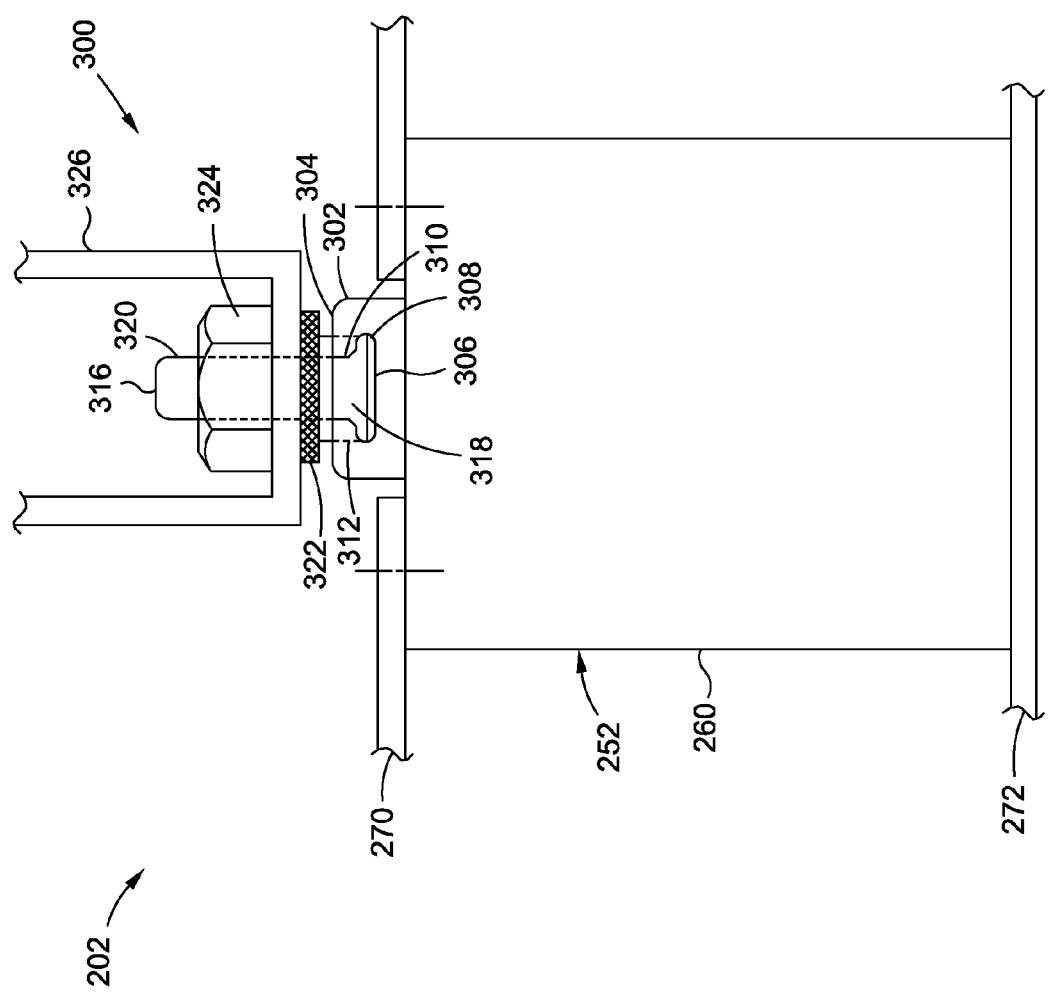
FIG. 10 is a sectional view of a panel assembly taken along line 10 of FIG. 9 and showing an example of the flight test equipment mounting system mounted to the top side of the panel assembly.

FIG. 10 shows an example of the flight test equipment mounting system 300 for securing the flight test equipment 402 to the panel assembly 252. As indicated above, one or more seat tracks 302 may be mounted to the top side of the panel assembly 252. The seat track fitting 316 may be mechanically fastened to the top side of the frame members 260. Although shown as a rectangular cross section, the interior frame members 260 of the panel assembly 252 may have any one of a variety of different cross-sectional shapes.

For example, the frame member 260 may each have an I-beam cross-sectional shape with a vertical web 266 and horizontally-oriented upper and lower flanges to which the seat track 302 may be secured. In addition, the top skin panels 270 may be removably attached to the frame member 260. For example, mechanical fasteners such as screws or bolts may be engaged to threaded receptacles such as nut plates, inserts, or other threaded receptacles for removably securing the top skin panels 270 to the frame members 260.

In FIG. 10, in one example, each seat track 302 may include have a hollow groove 306 extending along a length of the seat track 302. A fitting base 318 of the seat track fitting 316 may be inserted into the hollow groove 306. The fitting base 318 may be slidable along the length of the seat track 302 to adjust the forward-aft position of the seat track fitting 316. The seat track fitting 316 may include a post 320 extending upwardly from the fitting base 318. Once the seat track fitting 316 is moved into the desired forward-aft position along the seat track 302, a retainer 322 may be installed over the post 320 to lock the forward-aft position of the seat track fitting 316. The exposed portion of the post 320 may extend upwardly through a bore (not shown) formed in the base of the flight test equipment support beam 326. The post 320 may be threaded for receiving a threaded receptacle such as a nut or other locking member 324 to mechanically secure the flight test equipment support beam 326 to the seat track 302. In some examples, the flight test equipment support beam 326 may be omitted and the flight test equipment support panel 328 may be directly mounted to the seat track fitting 316. In other examples, the flight test equipment 402 or related hardware such as the personnel seats 420 may be directly attached to the seat track 302 using one or more seat track fittings 316 or by using a functionally equivalent means for attaching the flight test equipment 402 and/or the personnel seats 420 to the seat track(s) 302.

FIG. 11 shows an example of a lengthwise portion of a seat track 302 as may be mounted to a top side of the panel assembly 252 or to a frame member 260 of the panel assembly 252. As indicated above, the seat track 302 may have a hollow groove 306 extending along a length of the seat track 302. The groove 306 may be wider at a groove base 308 and narrower at a groove top 310 where the groove 306 is open to a top side 304 of the seat track 302. The groove top 310 may include a plurality of scalloped cutouts 312 (e.g., semicircular cutouts 312 or other shapes). The scallops 312 may be repeated along a lengthwise direction of the seat track 302. The cutouts 312 may be separated from immediately adjacent cutouts 312 by a pair of tabs 314 on each lateral side of the groove top 310.

The cutouts 312 may be equidistantly spaced along the length of the seat track 302 to allow for mechanically adjusting the position of a seat track fitting 316 at any one of a number of discrete locations along the seat track 302. The seat track fitting 316 may have a fitting base 318. The cross-section of the fitting base 318 may be sized and configured to fit within the hollow groove 306. In some examples, the seat track fitting 316 may be sized and configured to allow the fitting base 318 to be inserted into the hollow groove 306 from a vertical direction by aligning the shape (e.g., the lobes) of the fitting base 318 with the complementary-shaped scallops and vertically lowering the fitting base 318 into the hollow groove 306.

In FIG. 12, the fitting base 318 may be slidable within the groove base 308 along the length of the seat track 302. The seat track 302 may include a post 320 or a threaded stud extending upwardly from the fitting base 318 and out of the seat track 302. The fitting base 318 may be positionable relative to the cutouts 312 such that at least a portion of the fitting base 318 on one or both of the forward-aft ends of the fitting base 318 are positioned underneath one or more pairs of tabs 314 to prevent vertical movement of the seat track fitting 316 relative to the seat track 302.

In FIG. 13, a retainer 322 may be installed over the post 320 and secured relative to one or more of the cutouts 312 in the seat track 302 to lock the position of the seat track fitting 316 relative to the seat track 302. In some examples, the retainer 322 may be internally threaded to engage complementary external threads formed on the post 320 of the seat track fitting 316. The retainer 322 may have a retainer 322 base configured complementary to the shape of the cutouts 312 so that as the retainer 322 is threaded downwardly onto the post, the retainer 322 base may nest within one of the cutouts 312 to lock the forward-aft position of the seat track fitting 316 relative to the seat track 302. As may be appreciated, the seat track fitting 316 and retainer 322 may be provided in any one of a variety of different configurations, and is not limited to the configuration shown in FIGS. 11-13.

Figure 14:
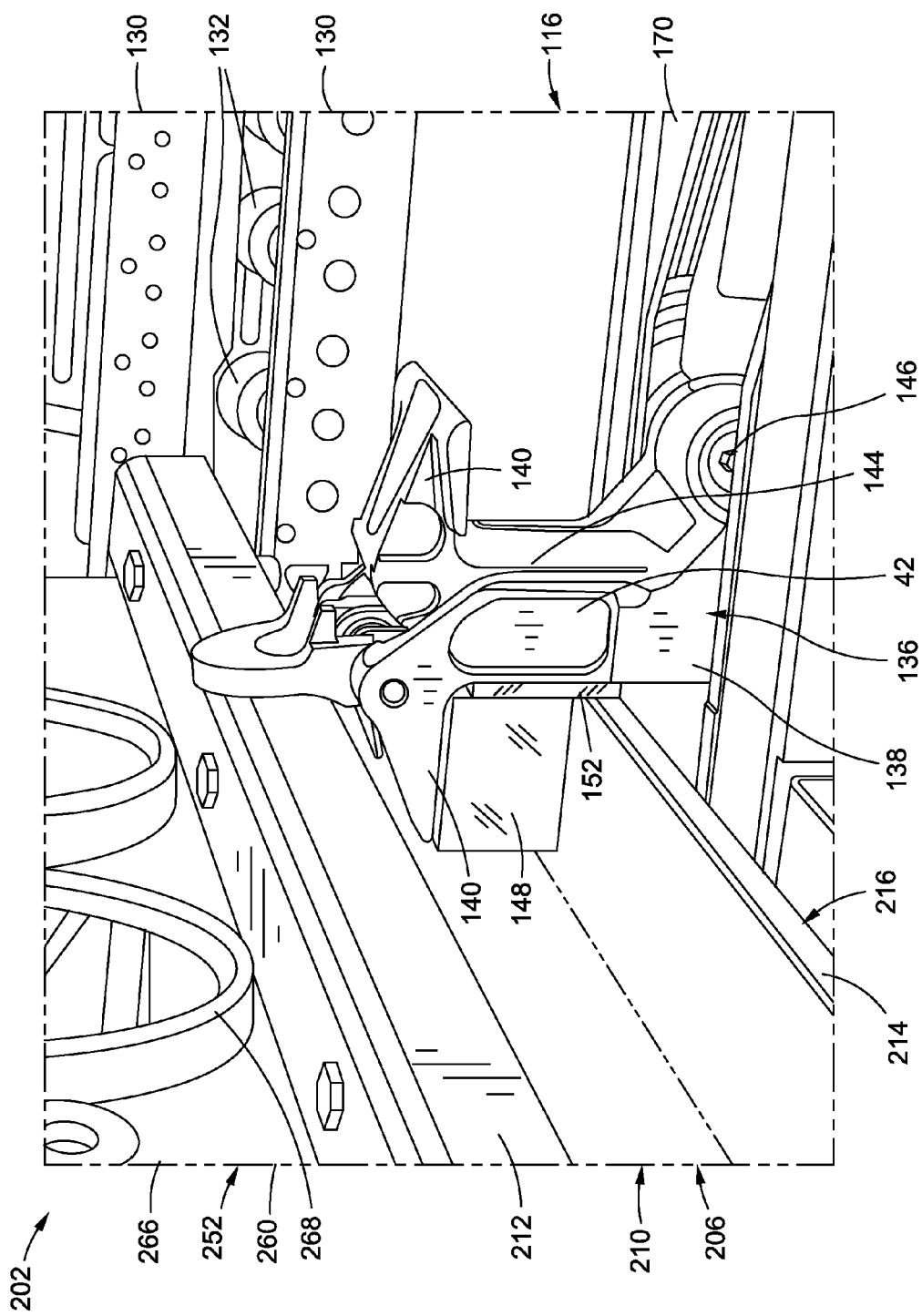
FIG. 14 is a perspective view of a pallet lock taken along line 14 of FIG. 8.

FIG. 14 is a perspective view of an example of a pallet lock 136 engaged to the cargo pallets 206 of a pair of pallet assemblies 202. The pallet lock 136 may prevent horizontal and/or vertical movement of one or more pallet assemblies 202. The pallet lock 136 may include a forward locking arm 142 and an aft locking arm 144 which may be pivotable about a block hinge pin 146. Each one of the pallet locks 136 may be spring-loaded and may be pivotably movable from a retracted position to a deployed position 138 when activated due to movement of a pall (not shown) tripped by a pallet assembly 202 passing over the pawl. The pallet locks 136 may be provided at spaced intervals along the cargo compartment floor 116 complementary to standardized lengths of the cargo pallet 206.

The pallet locks 136 may anchor the pallet assemblies 202 against longitudinal and vertical movement during movement of the aircraft 100 such as during changes in pitch of the aircraft 100 when the aircraft 100 is climbing, descending, or maneuvering, and/or during turbulence that may be encountered by the aircraft 100. In the deployed position 138, the forward and aft locking arms 142, 144 may extend above the level of the cargo compartment floor 116 and may respectively engage an opposing pair of pallet assemblies 202. Each one of the forward and aft locking arms 142, 144 may include a locking head 140 configured to engage the pallet support beam 210 extending along a perimeter edge 208 of the cargo pallet 206. In some examples, a shim assembly 148 (FIG. 15) and an elastomeric layer 152 may be installed to occupy the space between the pallet lock 136 and the perimeter support beam 210. As described below, the shim assembly 148 and the elastomeric layer 152 may be configured to reduce or minimize gaps 154 (FIG. 15) between the shim assembly 148 or elastomeric layer 152 and the locking head 140 or locking arm 142, 144 which may thereby reduce or minimize vertical movement and/or horizontal movement (e.g., in the forward-aft direction and/or in the lateral direction) of the pallet assembly 202 with a corresponding reduction in acceleration-induced loads on the flight test equipment 402. In addition, limiting horizontal movement of the pallet assemblies 202 may reduce or minimize stress on wiring connections between adjacent pallet assemblies 202.

FIG. 14 also shows an example of the attachment of a panel assembly 252 to the top side of a cargo pallet 206. The frame members 260 of the panel assembly 252 may be attached to the upper lip 212 of the cargo pallet 206 using mechanical fasteners installed along the perimeter edges 274. However, the panel assembly 252 may be attached by other means including, but not limited to, welding, bonding, or other attachment means. The panel assembly 252 frame members 260 may include wiring holes 268 in the vertical webs 266 to allow the passage of electrical wiring 406 for communication, power, and data transmission, and/or to allow the passage of conduits for fluid transmission. Electrical wiring 406 from one or more flight test equipment 402 flight test equipment 402 units may be routed through the wiring holes 268 in the frame members 260 in the panel assembly interior 258. The electrical wiring 406 may terminate at electrical connectors 408 (FIG. 5) extending out of one or more exterior sides of the panel assembly 252 to allow for electrically and/or communicatively coupling the flight test equipments of the panel assemblies 252. The wiring holes 268 may be lined with plastic, rubber grommets, or other edging material (FIG. 14) to protect the wiring from abrasive wear against bare edges of the wiring holes 268.

FIG. 15 is a cross-section of an example of a pallet lock 136 engaged to the pallet support beams 210 of the cargo pallets 206 of an adjacent pair of pallet assemblies 202. As indicated above, each one of the pallet support beams 210 may have a C-shaped cross-section defined by an upper and lower lip 212, 214 of the pallet support beam 210. The locking arms 142, 144 and/or locking heads 140 may be engaged to a shim 148 optionally installed between each one of the locking arms 142, 144 and/or locking heads 140 and the corresponding pallet support beam 210. The shim 148 may be attached to the locking arm 142, 144 and/or locking head 140, or the shim 148 may be attached to the pallet support beam 210. For example, in FIG. 15, a shim assembly 148 is shown attached to the forward locking arm 142 using lock wire 156 wrapped around the forward locking arm 142. Although not shown, the lock wire 156 may also be extended through a hole formed in the locking arm 142. The shim assembly 148 for the forward locking arm 142 may include a shim block 150 formed of relatively hard material such as metallic material (e.g., aluminum) and may include an elastomeric layer 152 applied (e.g., adhesively bonded and/or mechanically coupled) to the sides of the shim block 150. FIG. 15 also shows the aft locking arm 144 wherein a shim assembly 148 may be attached to the pallet support beam 210. For example, a shim 148 may be adhesively bonded to the lower lip 214 and the vertical web 266 of the pallet support beam 210. Although not shown, the shim assembly 148 may also be lock-wired to the aft locking arm 144.

As shown in FIG. 15 for the forward locking arm 142, the shim assembly 148 may be provided in a thickness that results in a predetermined gap 154 between the pallet lock 136 and the elastomeric layer 152 of the shim assembly 148. In one example, the shim assembly 148 (e.g., shim block 150 and elastomeric layer 152) may be configured to provide a gap 154 of between approximately 0.001-0.005 inch between the elastomeric layer 152 and the locking head 140 or locking arm 142, 144. A similar arrangement may be provided for the aft locking arm 144. The shim assembly 148 may limit vertical movement of the pallet assembly 202 to less than approximately 0.005 inch, and may also limit movement of the pallet assembly 202 in the forward-aft direction to 0.010 inch or less. By limiting limit vertical and/or horizontal movement (e.g., in the forward-aft direction and/or in the lateral or sideways direction) of the pallet assembly 202, acceleration or shock loads on the flight test equipment 402 may be reduced or minimized.

In FIG. 15, the lower lip 214 may have a chamfered lower edge 216 to facilitate movement of the pallet assembly 202 over the rollers 132 in the cargo compartment floor 116. The chamfered lower edge 216 may prevent otherwise sharp edges of the lower lip 214 ramming into the rollers 132 which may jar sensitive electronic equipment or other flight test equipment 402 components that may be mounted on the pallet assembly 202. Also shown in FIG. 15 is an optional gap cover 332 that may be applied over the gap or space between an adjacent pair of panel assemblies 252, as mentioned above.

Figure 16:
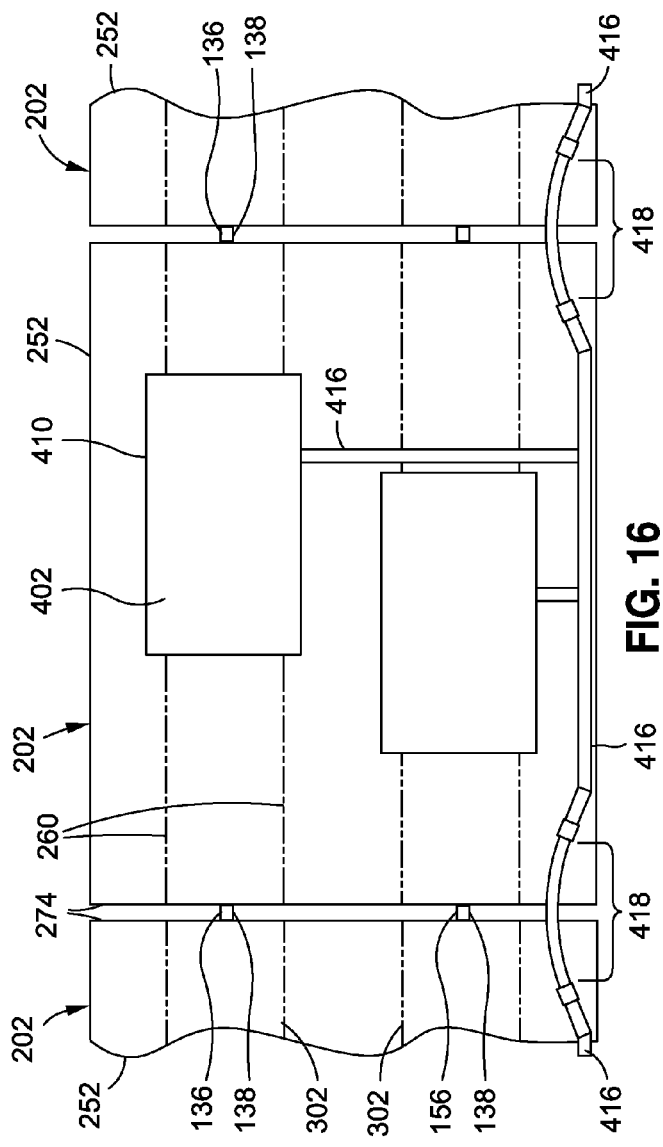
FIG. 16 is a top view of an example of a pallet assembly having ballast tanks mounted to the pallet assembly and showing a plurality of fluid conduits for interconnecting with ballast tanks on other pallet assemblies.

FIG. 16 shows an example of a pallet assembly 202 where the flight test equipment 402 is a pair of ballast tanks 410. The ballast tanks 410 on a given pallet assembly 202 may be fluidly interconnected using fluid conduits 416. In addition, the ballast tanks 410 on one end of a series of pallet assemblies 202 may be fluidly connected to ballast tanks 410 at other locations among the pallet system 200. For example, FIG. 2 illustrates ballast tanks 410 located on opposite ends of the pallet system 200 and which may be fluidly interconnected using the fluid conduits 416 extending along the sides of the series of pallet assemblies 202. Although not shown, the flight test equipment 402 may include one or more pumps configured to pump the liquid ballast (e.g., water) to different ballast tank 410 locations along the length of a pallet system 200 installed in an aircraft 100 to shift the center of gravity (CG) of the aircraft 100 forward or aftward during flight testing and assess the effects of CG shift on aircraft 100 performance.

Figure 17:
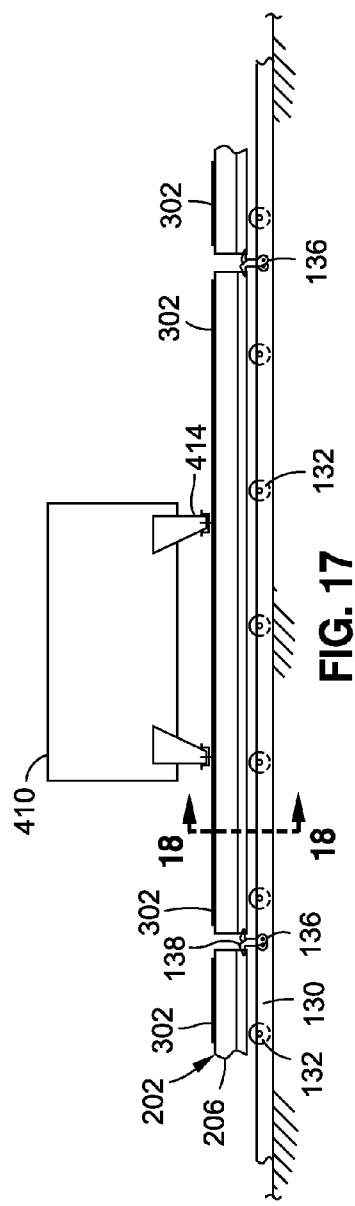
FIG. 17 is side view of the pallet assembly of FIG. 17.

FIG. 17 is side view of the pallet assembly 202. The ballast tank 410 may include tank legs 414 for supporting the liquid carrying portion of the tank. The tank legs 414 may be secured to the panel assembly 252 at the seat track fittings 316. The relative position of the ballast tanks 410 may be adjusted by moving the seat track fittings 316 relative to the seat track 302 as described above. Although FIGS. 17-18 illustrate two (2) ballast tanks 410 mounted to a pallet assembly 202, any number of ballast tanks 410 may be mounted to any given pallet assembly 202 up to the rated load-carrying capability of the pallet assembly 202.

Figure 18:
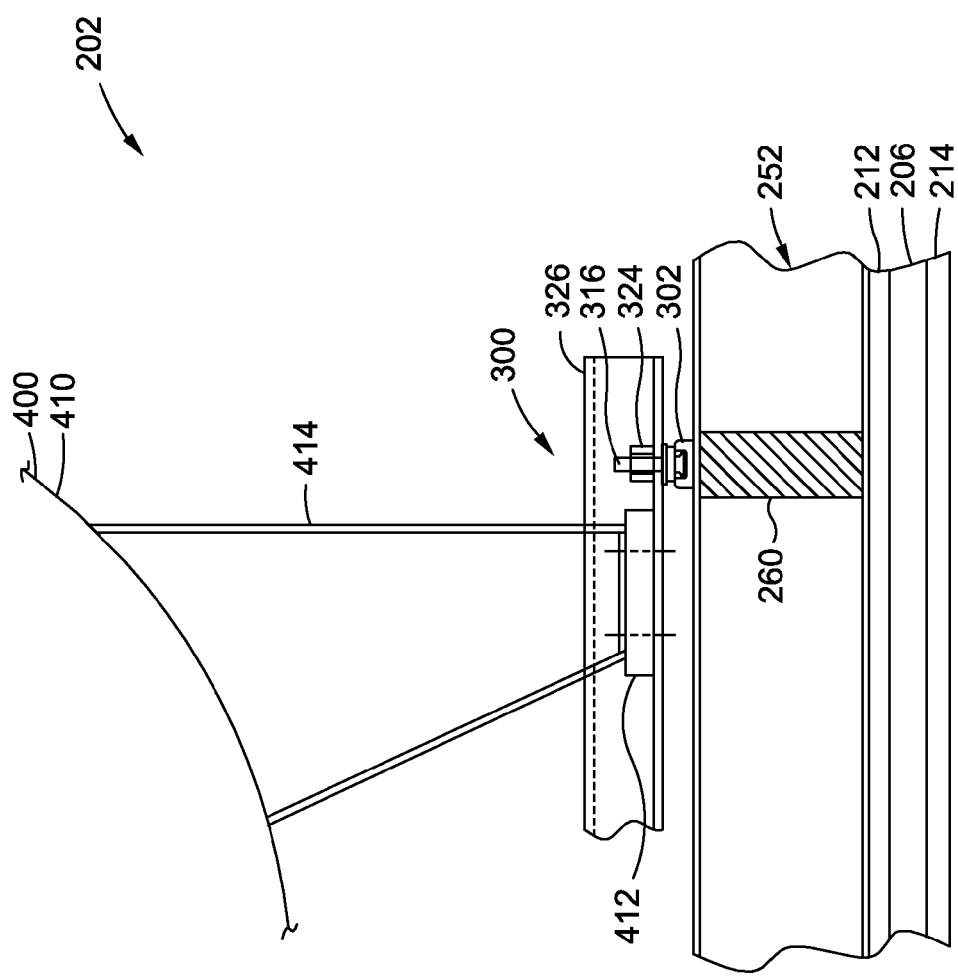
FIG. 18 is a side sectional view of a pallet assembly taken along line 18 of FIG. 17 and showing the mounting of the ballast tank to the panel assembly.

FIG. 18 is an aft sectional view of a pallet assembly 202 showing an example of a configuration of the mounting of a ballast tank 410 to a panel assembly 252. As indicated above, each one of the ballast tanks 410 may include tank legs 414. The tank legs 414 may be mounted on elastomeric supports 412 which, in turn, may be supported on a flight test equipment 402 support beam. The elastomeric supports 412 may be formed of a resiliently deformable elastomer material such as rubber. Each flight test equipment support beam 326 may be secured to one or more seat tracks 302 by means of the above-described seat track fittings 316 illustrated in FIGS. 10-13, or by means of other seat track fitting 316 configurations. Optionally, the tank legs 414 may be mounted directly onto the seat tracks 302.

Figure 19:
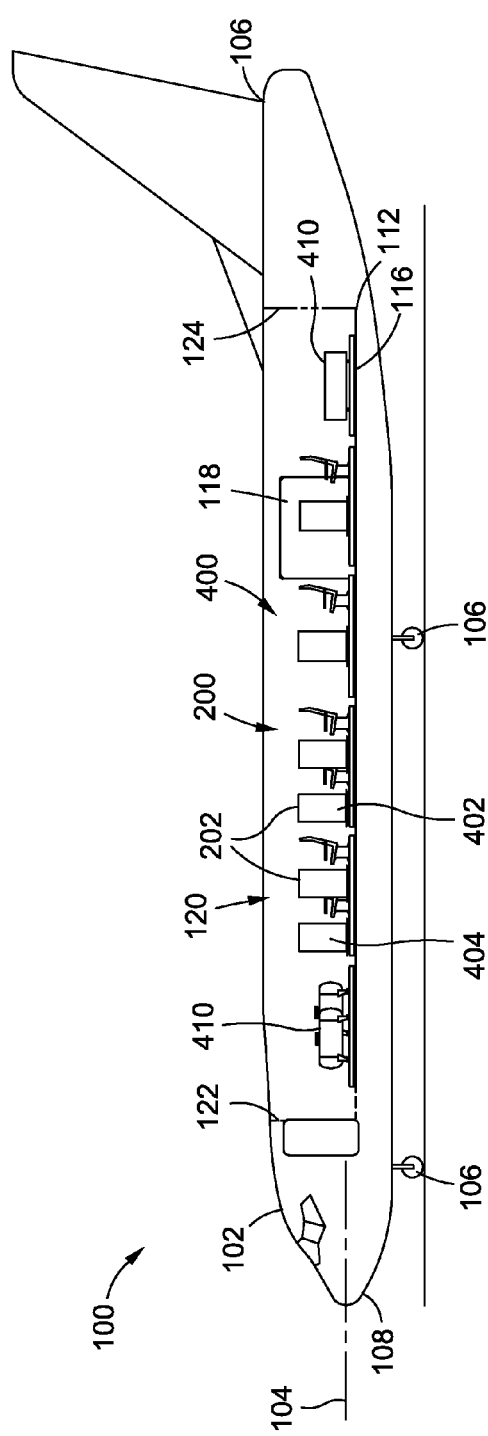
FIG. 19 is a side view of a further example of a pallet system for supporting flight test equipment on the main deck of an aircraft.
Figure 20:
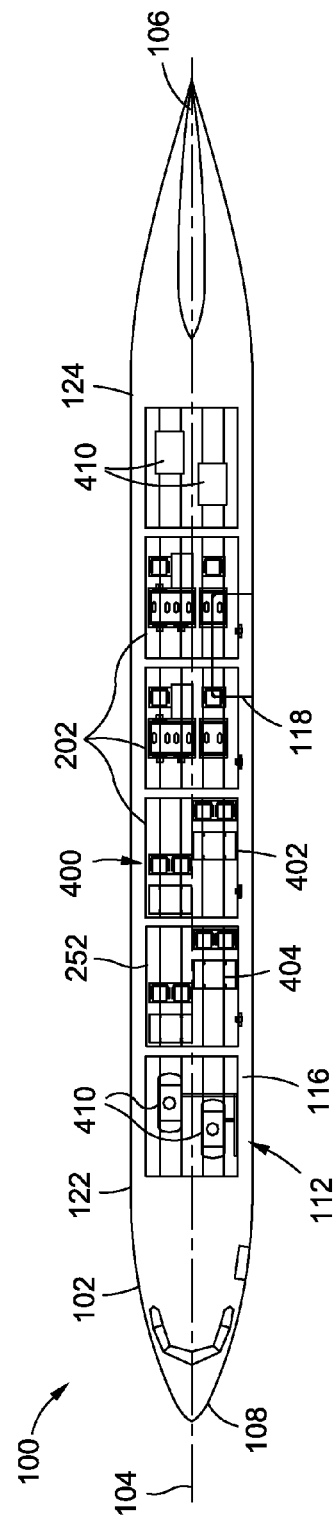
FIG. 20 is a top view of the aircraft of FIG. 19 illustrating the plurality of pallet assemblies supporting flight test equipment on the main deck of the aircraft.

FIG. 19-20 illustrate the installation of a pallet system 200 on the main deck 112 of an aircraft 100 that may lack a cargo deck 114 below the main deck 112. The main deck 112 may be provided with a cargo compartment floor 116 having side rails 134 (FIG. 4), roller tracks 130 (FIG. 4), pallet locks 136 (FIG. 4), and other provisions for moving the pallet assemblies 202 over the cargo compartment floor 116 and securing each pallet assembly 202 in a predetermined location on the cargo compartment floor 116 relative to other pallet assemblies 202. In the configuration shown, the pallet system 200 may include panel assemblies 252 having ballast tanks 410 located at extreme forward and aft 124 of the pallet system 200 and may include electronic flight test equipment 402 mounted to pallet assemblies 202 located between the ballast tanks 410. As in the above-described pallet system 200 installations, the flight test equipment 402 may be interconnected using electrical disconnects such as quick disconnects mounted on the terminal ends of electrical wiring 406 extending out of the wiring holes 268 on the perimeter edges 274 of each panel assembly 252. The ballast tanks 410 may be fluidly interconnecting using series of fluid conduits 416 extending lengthwise along the length of the pallet system 200.

Figure 21:
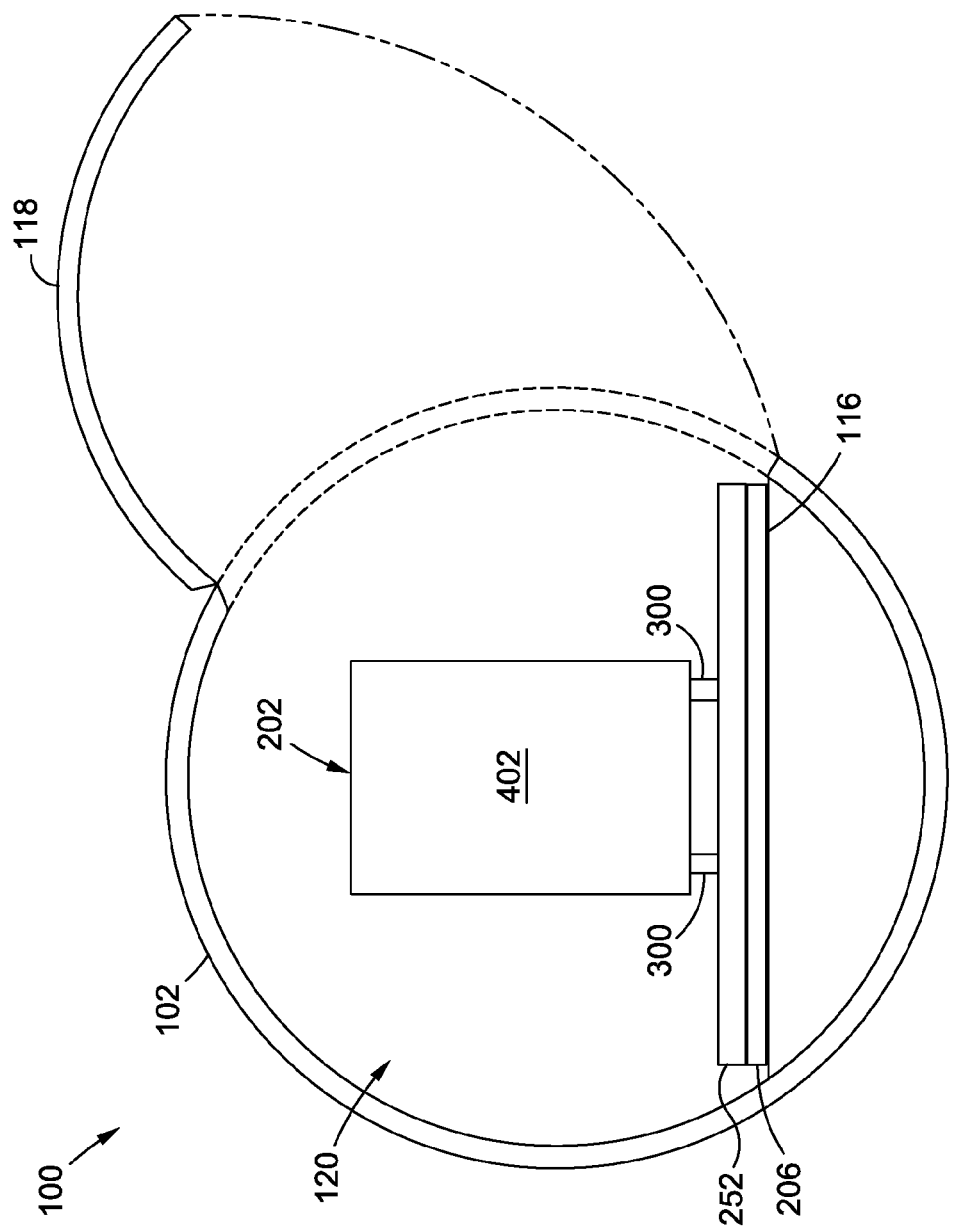
FIG. 21 is a sectional view of a fuselage and showing a pallet assembly secured to a cargo compartment floor on a main deck of an aircraft.

FIG. 21 is a sectional view of the aircraft 100 fuselage 102 of FIGS. 19-20 showing a main deck 112 having a pallet assembly 202 secured to a cargo compartment floor 116. The fuselage 102 may include one or more cargo doors 118 for loading and offloading the pallet assemblies 202. The pallet assemblies 202 may each include a standardized cargo pallet 206 having a width 256 that is complementary to the width of the main deck 112. The aircraft 100 in FIGS. 19-21 may be of a smaller size and may have a narrower fuselage 102 than the aircraft 100 shown in FIGS. 1-3 such that the cargo pallets 206 in FIGS. 19-21 may have a smaller standardized width 256 to fit within the narrow fuselage 102.

Figure 22:
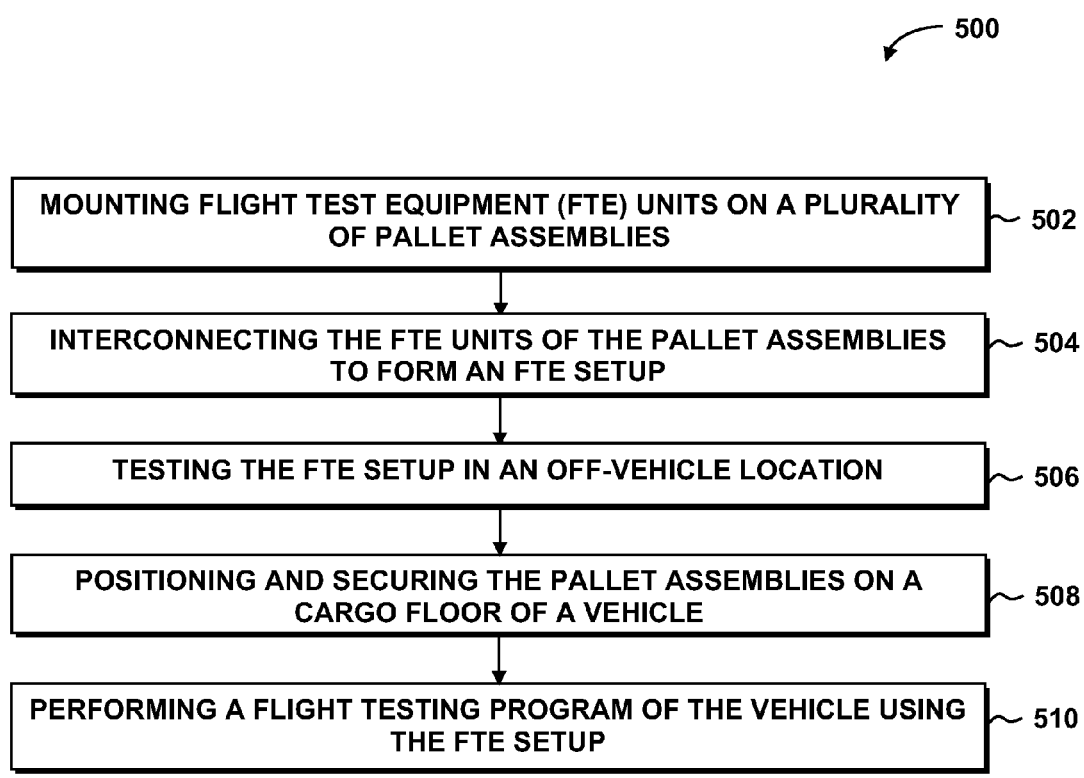
FIG. 22 is a flowchart having one or more operations that may be included in a method of configuring an aircraft for flight testing.

FIG. 22 is a flowchart having one or more operations that may be included in a method 500 of configuring an aircraft 100 for flight testing. The method may include Step 502 which may include mounting one or more flight test equipment 402 units on one or more pallet assemblies 202. As described above, each pallet assembly 202 may include a standardized cargo pallet 206 and a pallet adapter 250. The pallet adapter 250 may include a panel assembly 252 and one or more flight test equipment 402 mounting systems 300 for coupling the flight test equipment 402 units to the panel assembly 252. The pallet assembly 202 may be sized and configured complementary to the cargo pallet 206 and may attached to an upper side of the pallet assembly 202 as described above.

The method 500 may include assembling each one of the panel assemblies 252 with flight test equipment 402 to be used during a flight test program. Panel assemblies 252 may be assembled to duplicate the panel assemblies 252 and associated flight test equipment 402 shown in FIGS. 1-2 and may include panel assemblies 252 where the flight test equipment 402 includes ballast tanks 410, and panel assemblies 252 where the flight test equipment 402 includes electronic equipment such as file servers, data acquisition devices, data processors, and associated hardware. The step of mounting the flight test equipment 402 units on the pallet assemblies 202 may include adjusting the forward-aft position of each flight test equipment 402 unit using seat track fittings 316 coupled to seat tracks 302 mounted to the pallet assemblies 202 as described above and illustrated in FIGS. 5-6 and 9-13. One or mores seats 420 may also be mounted to the seat tracks 302 on the pallet assemblies 202.

Step 504 of the method may include assembling together the pallet assemblies 202 in a staging area in an off-vehicle location. The step of assembling the pallet assemblies 202 may include arranging each individual pallet assembly 202 in the same position that the pallet assembly 202 would occupy when installed inside the aircraft 100. The pallet assemblies 202 may be interconnected and pre-tested prior to installing the pallet assemblies 202 inside the aircraft 100. The pallet assemblies 202 may be assembled and pre-tested inside a building capable of simulating the environment (e.g., temperature, humidity) inside the aircraft 100 during actual flight testing. The method may include interconnecting the flight test equipment 402 of the different pallet assemblies 202 to form a flight test equipment setup 400 duplicating the arrangement of the flight test equipment setup 400 as the test equipment setup 400 would be installed on the aircraft 100. The interconnection of the flight test equipment 402 may include using wiring connectors extending out of wiring holes 268 of each panel assembly 252 to electrically connect the flight test equipment 402, as described above and illustrated in FIGS. 5 and 7. The method may also include fluidly interconnecting the fluid conduits 416 mounted to the sides of the panel assemblies using flexible conduit connectors 418, as described above and illustrated in FIGS. 7 and 16.

Step 506 of the method may include testing the flight test equipment setup 400 in the staging area such as the above-mentioned off-vehicle location. For example, the individual flight test equipment 402 components that make up the test equipment setup 400 may be electrically and fluidly interconnected to one another and pre-tested confirm that the assembled components function as intended. After pre-testing and checkout of the assembled test equipment setup 400, the flight test equipment 402 may be electrically and fluidly disconnected. The individual pallet assemblies 202 may be transported from the staging area to the aircraft 100 using a tractor or tug (not shown) pulling a train of trolleys or carts (not shown), each trolley or car bearing a pallet assembly 202. Each pallet assembly 202 may be marked with markings corresponding to the position of the pallet assembly 202 on the cargo compartment floor 116 relative to the other pallet assemblies 202 of the flight test equipment setup 400. A lift (not shown) may be employed to lift each pallet assembly 202 up to the level of the cargo door 118 after which the pallet assembly 202 may be moved inside the aircraft 100 and onto the cargo compartment floor 116 of the main deck 112 and/or cargo deck 114 of the aircraft 100.

Step 508 of the method may include loading the pallet assemblies 202 inside the aircraft 100 and locating each pallet assembly 202 at its designated position on the cargo compartment floor 116. The pallet assemblies 202 may be maneuvered into position relative to the other pallet assemblies 202 that make up the flight test equipment setup 400. Each pallet assembly 202 may be moved over the linear rollers 132 that may be included with the cargo compartment floor 116. In some examples, the pallet assemblies 202 may each be positioned against side rails 134 that may extend lengthwise along each side of the cargo compartment floor 116. Each pallet assembly 202 may be locked in position using one or more pallet locks 136 that may be included with the cargo compartment floor 116, as described above and illustrated in FIGS. 8 and 14-15. When deployed, the pallet locks 136 may prevent forward-aft movement of the pallet assemblies 202 during flight testing. The side rails 134 may prevent lateral or side-to-side movement of the pallet assemblies 202. However, the cargo compartment floor 116 may also include pallet locks 136 that may prevent side-to-side movement of the pallet assemblies 202.

The method may further include performing a flight testing program using the test equipment setup 400. In this regard, the test equipment setup 400 may be used to initiate different aspects of a flight test program. Flight test engineers may control and monitor the various parameters of the flight test program. The flight test equipment 402 units may collect data measured by sensors (not shown) mounted to different systems of the aircraft 100. For example, a variety of sensors may be mounted to the aircraft 100 propulsion units to measure pressure and temperature of the propulsion units during at different settings. Other sensors may measure strain and/or displacement of the aircraft 100 structure which the flight test equipment 402 units may use to determine flight loads carried by the aircraft 100 structure during different flight conditions. At the conclusion of the flight test, the flight test equipment 402 units may be electrically and fluidly disconnected and the panel assemblies 252 and associated flight test equipment 402 may be off-loaded from the aircraft 100.

Advantageously, the pallet system 200 disclosed herein significantly simplifies the installation and removal of flight test equipment 402 in an aircraft 100 by using standardized cargo compartment floor 116 hardware (e.g., floor rollers 132, side rails 134, pallet locks 136, etc.) without the need to temporarily or permanently alter the aircraft 100 interior, as required in conventional methods. In this regard, the pallet system 200 provides for increased flexibility for installing short-term flight test equipment 402 in a significantly reduced amount of time relative to conventional methods for installing flight test equipment 402 in an aircraft 100. In addition, the pallet system 200 disclosed herein provides a means for installing flight test equipment 402 in a wide variety of sizes and configurations of aircraft 100 including civilian, commercial, and military aircraft 100. In this regard, the pallet system 200 disclosed herein provides a means for installing flight test equipment 402 in a cargo-configured lower cargo bay of an aircraft and thereby preserve the furnishings (e.g., passenger seats, lavatory, galley) within the main cabin located above the cargo deck.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A pallet system for an aircraft, comprising:
   a cargo pallet;
   a pallet adapter sized and shaped complementary to the cargo pallet and
   attached to an upper side of the cargo pallet, the pallet adapter including:
   a panel assembly including frame members covered by one or more top skin panels and/or bottom skin panels;
   one or more seat tracks mounted to the panel assembly;
   one or more seat track fittings positionable at discrete locations along the one or more seat tracks;
   one or more flight test equipment support beams mounted to the seat tracks via the seat track fittings; and
   one or more flight test equipment units mounted to the one or more flight test equipment support beams.

2. The pallet system of claim 1, wherein the pallet adapter further includes:
   a flight test equipment support panel mounted on top of the flight test equipment support beams in spaced relation to the top of the panel assembly and supporting one or more flight test equipment units.

3. The pallet system of claim 1, further comprising:
   a shim interposed between a pallet lock and a pallet support beam, the shim having a thickness configured to limit vertical movement of the pallet support beam relative to a cargo compartment floor.

4. The pallet system of claim 1, further including:
   at least one seat having a seat base mounted to seat tracks on the panel assembly for accommodating an occupant.

5. The pallet system of claim 1, wherein:
   one or more of the flight test equipment units are configured as electronics.

6. The pallet system of claim 1, wherein:
one or more of the flight test equipment units are configured as ballast tanks.

7. The pallet system of claim 1, further including:
at least one flexible conduit connector coupling fluid conduits of an immediately adjacent pair of pallet assemblies.

8. An aircraft, comprising:
a cargo compartment floor having one or more pallet locks;
a plurality of pallet assemblies secured to the cargo compartment floor, at least one of the pallet assemblies including:
a cargo pallet having a flat, orthogonal shape;
a pallet adapter sized and shaped complementary to the cargo pallet and mechanically fastened to an upper side of the cargo pallet, the pallet adapter including:
a panel assembly formed of frame members covered by one or more top and bottom skin panels and having a hollow interior;
one or more seat tracks mounted to the panel assembly;
one or more seat track fittings positionable at discrete locations along the one or more seat tracks;
one or more flight test equipment support beams mounted to the seat tracks via the seat track fittings; and
one or more flight test equipment units mounted to the one or more flight test equipment support beams.

9. The aircraft of claim 8, wherein:
the one or more flight test equipment units of two or more panel assemblies being electrically and/or communicatively coupled by one or more electrical connectors on terminal ends of electrical wiring extending out of the panel assemblies.

10. The aircraft of claim 8, wherein:
at least two of the pallet assemblies each include at least one ballast tank and being fluidly coupled by fluid conduits; and
at least one flexible conduit connector coupling the fluid conduits of an immediately adjacent pair of pallet assemblies.

11. The aircraft of claim 8, wherein:
at least one pair of the pallet assemblies are positioned in forward-aft or side-by-side relation to one another on the cargo compartment floor and defining a gap between perimeter edges of the pallet assemblies; and
one or more gap covers installed over the gap between the pallet assemblies.

12. A method of installing flight test equipment in an aircraft, comprising:
mounting one or more flight test equipment units on a plurality of pallet
assemblies, at least one of the pallet assemblies including a cargo pallet and a pallet adapter sized complementary to the cargo pallet and attached to an upper side thereof, the pallet adapter including: a panel assembly;
one or more seat tracks mounted to the panel assembly;
one or more seat track fittings positionable at discrete locations along the one or more seat tracks; and
one or more flight test equipment support beams mounted to the seat tracks via the seat track fittings and supporting the one or more flight test equipment units;
interconnecting the flight test equipment units of the pallet assemblies to form a flight test equipment setup;
testing the flight test equipment setup in an off aircraft location; and
installing the pallet assemblies on a cargo compartment floor of the aircraft.

13. The method of claim 12, further comprising:
locking the pallets assemblies in position on the cargo compartment floor using one or more pallet locks.

14. The method of claim 12, further comprising:
limiting vertical movement of at least one of the pallet assemblies using a shim interposed between a pallet support beam and a pallet lock.

15. The method of claim 12, wherein the step of mounting one or more flight test equipment units:
mounting at least one passenger seat to at least one of the pallet assemblies.

16. The method of claim 12, further comprising:
adjusting a forward-aft position of at least one of the flight test equipment units using seat tracks coupled to at least one of the pallet assemblies.

17. The method of claim 12, further comprising:
electrically interconnecting at least two of the flight test equipment units using wiring connectors extending out of wiring holes formed in one or more of the panel assemblies.

18. The method of claim 12, further comprising:
fluidly connecting fluid conduits of ballast tanks mounted to adjacent pallet assemblies using a flexible conduit connector.

19. The method of claim 12, wherein the pallet adapter further includes a flight test equipment support panel mounted on top of the flight test equipment support beams, the step of mounting one or more flight test equipment units on a plurality of pallet assemblies comprising:
supporting at least one flight test equipment unit on the flight test equipment support panel.

20. The pallet system of claim 1, further comprising:
a shim interposed between a pallet lock and a pallet support beam, the shim configured to limit vertical movement and horizontal movement of the pallet support beam relative to a cargo compartment floor.

21. The method of claim 12, further comprising:
limiting vertical movement and horizontal movement of at least one of the pallet assemblies using a shim interposed between a pallet support beam and a pallet lock.

* * * * *